(12) United States Patent
Zhang et al.

(10) Patent No.: US 12,238,280 B2
(45) Date of Patent: Feb. 25, 2025

(54) VIDEO ENCODING METHOD, VIDEO PLAYBACK METHOD, RELATED DEVICE, AND MEDIUM

(71) Applicant: Tencent Technology (Shenzhen) Company Limited, Guangdong (CN)

(72) Inventors: Qing Zhang, Guangdong (CN); Shitao Wang, Guangdong (CN); Shan Liu, San Jose, CA (US)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 247 days.

(21) Appl. No.: 17/719,691

(22) Filed: Apr. 13, 2022

(65) Prior Publication Data

US 2022/0239904 A1 Jul. 28, 2022

Related U.S. Application Data

(63) Continuation of application No. PCT/CN2021/089770, filed on Apr. 26, 2021.

(30) Foreign Application Priority Data

May 25, 2020 (CN) .......................... 202010452023.1

(51) Int. Cl.
*H04N 19/00* (2014.01)
*H04N 19/105* (2014.01)
(Continued)

(52) U.S. Cl.
CPC ......... *H04N 19/107* (2014.11); *H04N 19/105* (2014.11); *H04N 19/14* (2014.11); *H04N 19/176* (2014.11); *H04N 19/46* (2014.11)

(58) Field of Classification Search
CPC .... H04N 19/107; H04N 19/105; H04N 19/14; H04N 19/176; H04N 19/46
See application file for complete search history.

(56) References Cited

U.S. PATENT DOCUMENTS

| | | | |
|---|---|---|---|
| 2016/0261861 A1* | 9/2016 | Tu | ......................... H04N 19/176 |
| 2016/0261870 A1* | 9/2016 | Tu | ......................... H04N 19/109 |
| 2017/0180748 A1* | 6/2017 | Zhou | ..................... H04N 19/105 |

FOREIGN PATENT DOCUMENTS

| | | |
|---|---|---|
| CN | 104902271 A | 9/2015 |
| CN | 105898297 A | 8/2016 |

(Continued)

OTHER PUBLICATIONS

Xu et al. "CN 105898297A Translation". (Year: 2016).*
International Search Report and Written Opinion mailed Jul. 16, 2021 for International Application No. PCT/CN2021/089770.

*Primary Examiner* — Zhihan Zhou
(74) *Attorney, Agent, or Firm* — Crowell & Moring LLP

(57) ABSTRACT

This application discloses a video encoding method, a video playback method, a related device, and a medium. The video encoding method may include: obtaining a target prediction unit in a target image block and a mode information set; performing abnormal distortion point detection on the target prediction unit in at least one candidate prediction mode in the mode information set, to obtain a detection result corresponding to the at least one candidate prediction mode; calibrating a mode cost of the at least one candidate prediction mode in the mode information set according to the detection result corresponding to the at least one candidate prediction mode, to obtain a calibrated mode information set; selecting a target prediction mode from the plurality of candidate prediction modes according to the mode costs of the candidate prediction modes in the calibrated mode information set; and performing prediction on the target prediction unit by using the target prediction mode, to obtain encoded data of the target image block.

11 Claims, 10 Drawing Sheets

(51) Int. Cl.
*H04N 19/107* (2014.01)
*H04N 19/14* (2014.01)
*H04N 19/176* (2014.01)
*H04N 19/46* (2014.01)

(56) References Cited

FOREIGN PATENT DOCUMENTS

| | | |
|---|---|---|
| CN | 109547798 A | 3/2019 |
| CN | 111629206 A | 9/2020 |

\* cited by examiner

LCU: Largest coding unit
CU: Coding unit (image block)

AMVP mode: Prediction mode in which motion vector data, index information, and a residual coefficient need to be transmitted Ordinary Merge mode: Prediction mode in which index information and a residual coefficient need to be transmitted SKIP mode: Prediction mode in which index information needs to be transmitted ● Therefore, everyone is welcome to discuss!

Encoding

● Therefore, everyone is welcome to discuss!

VIDEO ENCODING METHOD, VIDEO PLAYBACK METHOD, RELATED DEVICE, AND MEDIUM

RELATED APPLICATION

This application is a continuation and claims priority to International PCT Application No. PCT/CN2021/089770, filed on Apr. 26, 2021, which is based on and claims priority to Chinese Patent Application No. 202010452023.1 filed with the China National Intellectual Property Administration on May 25, 2020, both entitled "VIDEO ENCODING METHOD, VIDEO PLAYBACK METHOD, RELATED DEVICE, AND MEDIUM" Both of these prior patent applications are herein incorporated by reference in their entireties.

FIELD OF THE TECHNOLOGY

This application relates to the field of Internet technologies, specifically, to the field of image processing technologies, and in particular, to a video encoding method, a video playback method, a video encoding apparatus, a video playback apparatus, a video encoding device, a video playback device, and a computer storage medium.

BACKGROUND OF THE DISCLOSURE

Video encoding process generally divides a to-be-encoded image into a plurality of image blocks, and obtain bitstream data of the to-be-encoded image by encoding each of the image blocks. In a process of encoding any image block, it usually needs to encode an image block using a prediction mode, to, e.g., in an inter-prediction mode, obtain a residual block of the image block; and then, perform subsequent processing, such as transformation and quantization, on the residual block, so as to obtain encoded data of the image block. Studies have shown that in a process of encoding an image block, if a prediction mode selected for a prediction unit is not suitable, it is easy to cause the image block to generate a relatively large distortion after the encoding, resulting in relatively low subjective quality of the image block.

SUMMARY

Embodiments of the present disclosure provide a video encoding method, a video playback method, a related device, and a medium.

A video encoding method is provided, including:
obtaining a target prediction unit in a target image block and a mode information set of the target prediction unit, the mode information set including a plurality of candidate prediction modes and mode costs of the candidate prediction modes;
performing abnormal distortion point detection on the target prediction unit in at least one candidate prediction mode in the mode information set, to obtain a detection result corresponding to the at least one candidate prediction mode;
calibrating a mode cost of the at least one candidate prediction mode in the mode information set according to the detection result corresponding to the at least one candidate prediction mode, to obtain a calibrated mode information set;
selecting a target prediction mode from the plurality of candidate prediction modes according to the mode costs of the candidate prediction modes in the calibrated mode information set; and
performing prediction on the target prediction unit by using the target prediction mode, to obtain encoded data of the target image block.

A video encoding apparatus is provided, including:
an obtaining unit, configured to obtain a target prediction unit in a target image block and a mode information set of the target prediction unit, the mode information set including a plurality of candidate prediction modes and mode costs of the candidate prediction modes; and
an encoding unit, configured to perform abnormal distortion point detection on the target prediction unit in at least one candidate prediction mode in the mode information set, to obtain a detection result corresponding to the at least one candidate prediction mode,
the encoding unit being further configured to calibrate a mode cost of the at least one candidate prediction mode in the mode information set according to the detection result corresponding to the at least one candidate prediction mode, to obtain a calibrated mode information set;
the encoding unit being further configured to select a target prediction mode from the plurality of candidate prediction modes according to the mode costs of the candidate prediction modes in the calibrated mode information set; and
the encoding unit being further configured to perform prediction on the target prediction unit by using the target prediction mode, to obtain encoded data of the target image block.

A computer device is provided, including a memory and one or more processors, the memory storing computer-readable instructions, the computer-readable instructions, when executed by the one or more processors, causing the one or more processors to perform the operations of the foregoing video encoding method.

One or more non-volatile computer-readable storage media storing computer-readable instructions are provided, the computer-readable instructions, when executed by one or more processors, causing the one or more processors to perform the operations of the foregoing video encoding method.

A computer program product or a computer program is provided, the computer program product or the computer program including computer-readable instructions, the computer-readable instructions being stored on a computer-readable storage medium, a processor of a computer device reading the computer-readable instructions from the computer-readable storage medium, and the processor executing the computer-readable instructions to cause the computer device to perform the operations of the foregoing video encoding method.

A video playback method, performed by a video playback device, is provided, including:
obtaining bitstream data of frames of images in an image frame sequence corresponding to a target video, bitstream data of each frame of image including encoded data of a plurality of image blocks, encoded data of image blocks in frames of images in the image frame sequence other than the first frame of image being obtained by using the foregoing video encoding method;
decoding the bitstream data of the frames of images, to obtain the frames of images; and
displaying the frames of images sequentially in a playback interface.

A video playback apparatus is provided, including:

an obtaining unit, configured to obtain bitstream data of frames of images in an image frame sequence corresponding to a target video, bitstream data of each frame of image including encoded data of a plurality of image blocks, encoded data of image blocks in frames of images in the image frame sequence other than the first frame of image being obtained by using the foregoing video encoding method;

a decoding unit, configured to decode the bitstream data of the frames of images, to obtain the frames of images; and a display unit, configured to display the frames of images sequentially in a playback interface.

A computer device is provided, including a memory and one or more processors, the memory storing computer-readable instructions, the computer-readable instructions, when executed by the one or more processors, causing the one or more processors to perform the operations of the foregoing video playback method.

One or more non-volatile computer-readable storage media storing computer-readable instructions are provided, the computer-readable instructions, when executed by one or more processors, causing the one or more processors to perform the operations of the foregoing video playback method.

A computer program product or a computer program is provided, the computer program product or the computer program including computer-readable instructions, the computer-readable instructions being stored on a computer-readable storage medium, a processor of a computer device reading the computer-readable instructions from the computer-readable storage medium, and the processor executing the computer-readable instructions to cause the computer device to perform the operations of the foregoing video playback method.

BRIEF DESCRIPTION OF THE DRAWINGS

To describe the technical solutions in the embodiments of the present disclosure more clearly, the following briefly describes the accompanying drawings. The accompanying drawings in the following description show examples of embodiments of the present disclosure, and a person of ordinary skill in the art may still derive other drawings from these accompanying drawings without creative efforts.

DESCRIPTION OF EMBODIMENTS

The technical solutions of the embodiments of the present disclosure are described below with reference to the accompanying drawings of the embodiments of the present disclosure.

Figure 1A:
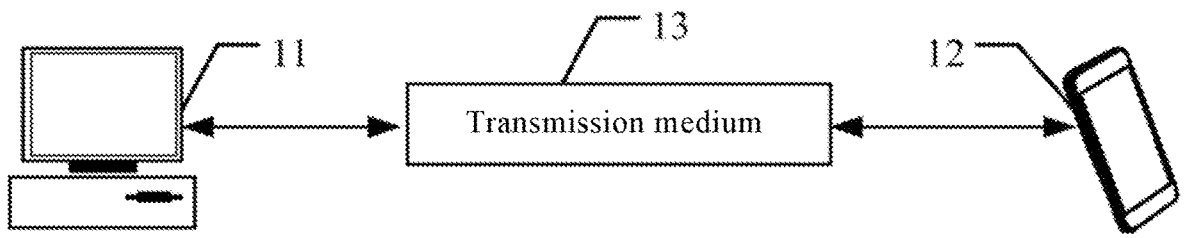
FIG. 1a is a schematic architectural diagram of an example image processing system according to an embodiment of the present disclosure.

In this embodiment of the present disclosure, an image processing system is described. Referring to FIG. 1a, the image processing system may include at least a video encoding device 11, a video playback device (video decoding device) 12, and a transmission medium 13. The video encoding device 11 may be a server or a terminal. The server herein may be an individual physical server, or may be a server cluster or a distributed system formed by a plurality of physical servers, or may be a cloud server that provides a basic cloud service such as cloud computing, a cloud database, cloud computing, a cloud function, cloud storage, a network service, cloud communication, a middleware service, a domain name service, a security service, a content delivery network (CDN), big data, and an artificial intelligence platform, or the like. The terminal may be a smartphone, a tablet computer, a notebook computer, a desktop computer, or the like. The video encoding device 11 may include an encoder inside. The encoder is configured to perform a series of encoding procedures. The video playback device 12 may be any device having a video playback function, for example, a terminal, such as a smartphone, a tablet computer, a notebook computer, or smartwatch, or a device that can project video images to a screen projection for playback, for example, a projection instrument or projector. The video playback device 12 may include at least a decoder. The decoder is configured to perform a series of decoding procedures. The transmission medium 13 refers to a space or an entity through which data is transmitted, is mainly configured to transmit data between the video encoding device 11 and the video playback device 12, and specifically includes, but is not limited to, a network medium such as a mobile network, a wireless network, or a wired network, or a removable hardware medium with read and write functions such as a Universal Serial Bus (USB) disk or a removable hard disk. FIG. 1a only exemplarily represents an architecture of an image processing system involved in the embodiments of the present disclosure instead of limiting a specific architecture of the image processing system. For example, in another embodiment, the video encoding device 11 and the video playback device 12 may alternatively be a same device. In another example, in another embodiment, a quantity of the video playback devices 12 may alternatively be not limited to one, and so on.

Figure 1B:
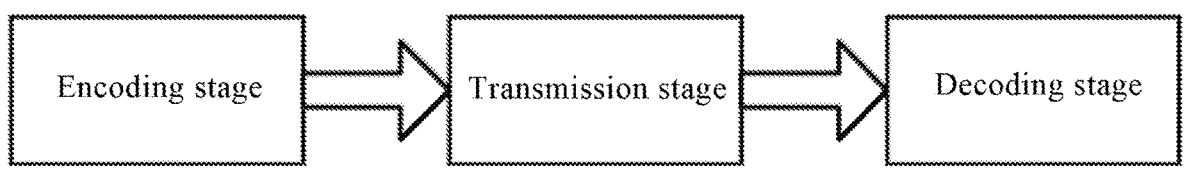
FIG. 1b is a schematic diagram of an example image processing procedure according to an embodiment of the present disclosure.

In the foregoing image processing system, a processing procedure for any frame of image in the image frame sequence, as shown in FIG. 1b, roughly includes the following stages:

(1) Encoding Stage

Figure 1C:
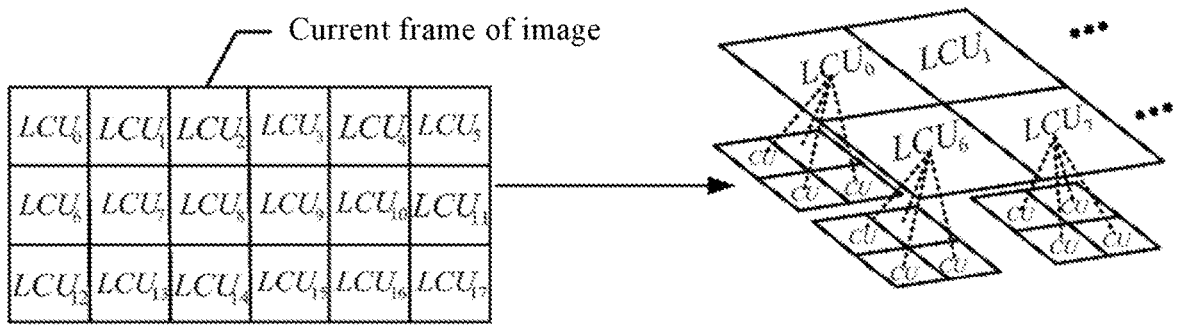
FIG. 1c is a schematic diagram of dividing a frame of image into image blocks according to an example embodiment of the present disclosure.

After obtaining a to-be-encoded current frame of image, the encoder in the video encoding device 11 can encode the current frame of image based on a mainstream video encoding standard, to obtain bitstream data of the current frame of image. The mainstream video encoding standard may include, but is not limited to, H.264, H.265, Versatile Video Coding (VVC), Audio Video coding Standard 3 (AVS3), and the like. H.265 herein is also referred to as High Efficiency Video Coding (HEVC). Using H.265 as an example, an approximate encoding process thereof is specifically as follows:

① Divide the to-be-encoded current frame of image into a plurality of image blocks (or referred to as coding units (CUs)), the image block referring to a basic unit of video encoding. In a specific implementation, the to-be-encoded current frame of image may first be divided into a plurality of non-overlapping largest coding units (LCUs). Then, a corresponding LCU may be further divided into a plurality of CUs according to a characteristic of each LCU, as shown in FIG. 1c. FIG. 1c only exemplarily shows a manner of dividing an LCU instead of limiting the manner. As shown in FIG. 1c, an LCU is divided into a plurality of CUs evenly, but actually, the LCU may alternatively be divided into a plurality of CUs unevenly. Each CU may correspond to a prediction mode of one mode type, such as an inter mode and an intra mode. The intra mode is mainly searching encoded image blocks in a current frame of image for a reference image block, and performing prediction by using decoding information of the reference image block. In the intra mode, a corresponding prediction mode and residual information need to be transmitted to the decoder. The inter mode is mainly searching, according to motion estimation (ME) and motion compensation (MC) of a current image block, encoded frames of images in an image frame sequence for a reference image block matching the current image block, and using decoding information of the reference image block to perform prediction based on a motion vector (MV).

Figure 1D:
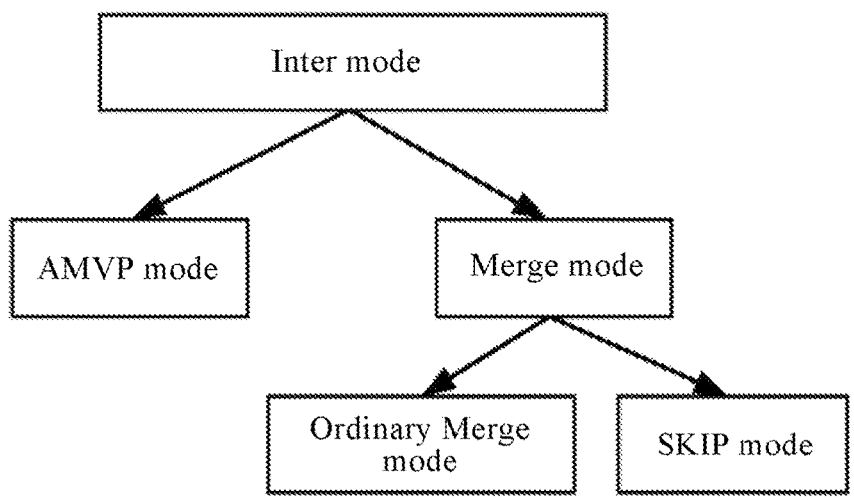
FIG. 1d is a schematic diagram of division of an inter mode according to an example embodiment of the present disclosure.

Referring to FIG. 1d, the inter mode may include at least an advanced motion vector prediction (AMVP) mode and a Merge mode. In the AMVP mode, motion vector data (MVD) of a current image block, index information of a reference image block, and residual information of the current image block need to be transmitted to the decoder. The MVD refers to a difference between an MVP (predicted motion vector) and a motion vector obtained based on motion estimation (ME). In the Merge mode, motion vector data (MVD) of a current image block does not need to be transmitted, and the Merge mode may be subdivided into an ordinary Merge mode and a SKIP mode. The SKIP mode herein is a special case in the Merge mode. A difference between the SKIP mode and the ordinary Merge mode is that: in the ordinary Merge mode, index information of a reference image block and residual information of a current image block need to be transmitted to the decoder, while in the SKIP mode, only the index information of the reference image block needs to be transmitted to the decoder without transmitting the residual information of the current image block.

② Perform, the to-be-encoded current image block, pixel value prediction on pixels in the current image block, to obtain a predicted block corresponding to the current image block, the predicted block including predicted values of the pixels. In a specific implementation, the current image block may be further divided into one or more prediction units (PUs), and a mode decision may be made to dynamically determine prediction modes of prediction units corresponding to the current image block according to a feature of an input signal. Specifically, a mode type, such as an inter mode type or an intra mode type, may be determined first according to a feature of the current image block; and then corresponding prediction modes may be selected from prediction modes of the mode type receptively according to features of prediction units. If the determined mode type is an intra mode type, prediction modes of the prediction units corresponding to the current image block are all an intra mode. If the determined mode type is an inter mode type, the prediction modes of the prediction units corresponding to the current image block may be an AMVP mode, an ordinary Merge mode, or a SKIP mode. In this case, the prediction modes of the prediction units corresponding to the current image block may be the same or different. After the prediction modes of the prediction units are determined, prediction may be performed on the prediction units by using the corresponding prediction modes, and a prediction result of each prediction unit can be obtained. Then, a predicted block corresponding to the current image block is obtained by combining prediction results of the prediction units.

③ Calculate a residual block of the current image block according to the predicted block and the current image block, the residual block including differences between predicted values and actual pixel values of pixels in the current image block; and then perform transformation, quantization, and entropy encoding sequentially on the residual block, to obtain encoded data of the current image block. Steps ② and ③ involved in the foregoing encoding procedure are iteratively performed until all image blocks in the current frame of image are encoded. In this case, encoded data of the image blocks included in the current frame of image can be obtained, so as to obtain bitstream data of the current frame of image.

(2) Transmission Stage

The video encoding device 11 obtains the bitstream data and the encoding information of the current frame of image through the foregoing encoding stage and transmits them to the video display device 12, so that the video display device 12 decodes the encoded data of the image blocks by using the encoding information used in the decoding stage, to obtain the current frame of image. The bitstream data includes the encoded data of the image blocks in the current frame of image. The encoding information may include at least transmission information specified by a prediction mode adopted when prediction is performed on the prediction units of the images blocks in the current frame of image, for example, transmission information, such as motion vector data of the current image block, index information of the reference image block, and residual information of the current frame of image, specified by the AMVP mode, or transmission information, such as the index information of the reference image block, specified by the SKIP mode.

(3) Decoding Stage

After receiving the bitstream data and the encoding information of the current frame of image, the video playback device 12 may sequentially decode the encoded data of the image blocks in the bitstream data according to the encoding information. A decoding process for any image block is specifically as follows: performing decoding, inverse quantization, and inverse transformation sequentially on the encoded data of the current image block, to obtain a residual block of the current image block. Then, the prediction modes used for the prediction units of the current image block can be determined according to the transmission information corresponding to the current image block in the encoding information, and the image block can be obtained according to the determined prediction modes and the residual block. Steps involved in the foregoing decoding procedure are iteratively performed, to obtain the image blocks of the current frame of image, so as to obtain the current frame of image. After obtaining the current frame of image, the video playback device 12 can display the current frame of image in the playback interface.

Figure 1E:
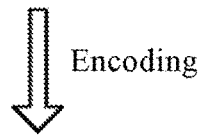
FIG. 1e is a schematic diagram of encoding a frame of an image according to an example embodiment of the present disclosure.

It can be learned from the foregoing image processing procedure that the mode decision process involved in the encoding stage usually involves a plurality of prediction modes. If the prediction modes selected for the prediction units in the mode decision process are inappropriate, and a quantization parameter (QP) involved in transformation and quantization on the residual block is relatively large, the image block is caused to easily generate some particularly abnormal distortion points after encoding, such as pixels with distortion as high as 100+, which further causes some dirty spots to appear in the image block decoded through the decoding stage, resulting in impact on subjective quality of image blocks and frames of images, as shown in FIG. 1e. Based on this, the embodiments of the present disclosure provide a video encoding scheme. The video encoding scheme is mainly used to guide the encoder to make a mode decision during encoding, reduce a probability that the image block generates an abnormal distortion point after the encoding by selecting appropriate prediction modes for the prediction units. The abnormal distortion point refers to a pixel of which an absolute value of a difference between a pixel value obtained through decoding and a pixel value before encoding is greater than a specific threshold. In a specific implementation, a scheme principle of the video encoding scheme is roughly as follows:

For a to-be-encoded target frame of image, the target frame of image may be divided into one or more image blocks, and an image block may be selected from the target frame of image as a to-be-encoded target image block, and then the target image block is further divided into one or more prediction units. For any prediction unit in the target image block, when a prediction mode is selected for the prediction unit through a mode decision, mode costs of prediction modes may be obtained first, and whether there is an abnormal distortion point in the prediction unit in at least one prediction mode is detected. If there is no abnormal distortion point, a prediction mode is selected from a plurality of prediction modes for the prediction unit by using a mode decision algorithm, and the mode decision algorithm herein is used to indicate selecting a prediction mode with a least select mode cost. If there is an abnormal distortion point, the mode decision algorithm is adjusted. The adjusting the mode decision algorithm herein means: first calibrating a mode cost of a prediction mode corresponding to a prediction unit in which there is an abnormal distortion point, and then, selecting a prediction mode for the prediction unit according to the calibrated mode cost of the prediction mode that is calibrated and the mode cost of the prediction mode that is not calibrated. After the prediction mode is selected for the prediction unit, prediction can be performed on the prediction unit by using the selected prediction mode, and the foregoing steps are iterated to perform prediction on all the prediction units in the target image block, thereby obtaining encoded data of the target image block. After the encoded data of the target image block is obtained, an image block can be re-selected from the target frame of image as a new target image block, and the foregoing steps are performed to obtain encoded data of the new target image block. After all image blocks in the target frame of image are encoded, bitstream data of the target frame of image can be obtained.

Figure 1F:
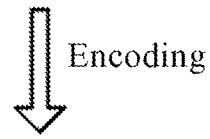
FIG. 1f is another schematic diagram of encoding a frame of an image according to an example embodiment of the present disclosure.

To more clearly describe the beneficial effects of the video coding scheme provided in the embodiments of the present disclosure, an example in which a target frame of image is an original frame of image shown in the upper-side diagram in FIG. 1e is still used, and the target frame of image is encoded by using the video encoding scheme of the embodiments of the present disclosure, to obtain the encoded frame of image shown in the lower-side diagram in FIG. 1f. It can be learned by comparing the lower-side diagram in FIG. 1e with the lower-side diagram in FIG. 1f, in the encoding scheme provided in the embodiments of the present disclosure, an abnormal distortion point detection mechanism is added to a mode decision process, to correct the mode decision process according to an abnormal distortion point detection result, thereby effectively reducing a quantity of abnormal distortion points generated by a target frame of image frame after encoding, and improving the subjective quality of the target frame of image.

In the embodiments of the present disclosure, during encoding, abnormal distortion point detection can be first performed on the target prediction unit in at least one candidate prediction mode in the mode information set, to obtain a detection result corresponding to the at least one candidate prediction mode. Subsequently, a mode cost of the at least one candidate prediction mode in the mode information set can be calibrated according to the detection result corresponding to the at least one candidate prediction mode, so that mode costs of the candidate prediction modes in the calibrated mode information set can more accurately reflect bit rates and distortions corresponding to the corresponding candidate prediction modes. Therefore, a target prediction mode more suitable for the target prediction unit can be selected from the plurality of candidate prediction modes according to the mode costs of the candidate prediction modes in the calibrated mode information set. Prediction is then performed on the target prediction unit by using the suitable target prediction mode, to obtain encoded data of the target image block, so that a probability that a distortion appears in the target image block after encoding is reduced to some extent. In addition, because in the embodiments of the present disclosure, a suitable target prediction mode is mainly selected by correcting the mode decision process to reduce the distortion probability, the image compression quality and the subjective quality of the target image block are effectively improved without affecting compression efficiency and encoding complexity.

In the embodiments of the present disclosure, bitstream data of frames of images in an image frame sequence corresponding to a target video may be obtained first, bitstream data of each frame of image including encoded data of a plurality of image blocks. Then, the bitstream data of the frames of images may be decoded, to obtain the frames of images; and the frames of images are displayed sequentially in a playback interface. Encoded data of image blocks in frames of images in the image frame sequence corresponding to the target video other than the first frame of image being obtained by using the foregoing video encoding method. Therefore, a probability that a distortion appears in image blocks can be effectively reduced, so that when frames of images are displayed in the playback interface, a probability that a dirty spot appears in the frames of images can be reduced to some extent, thereby improving the subjective quality of the frames of images.

Figure 2:
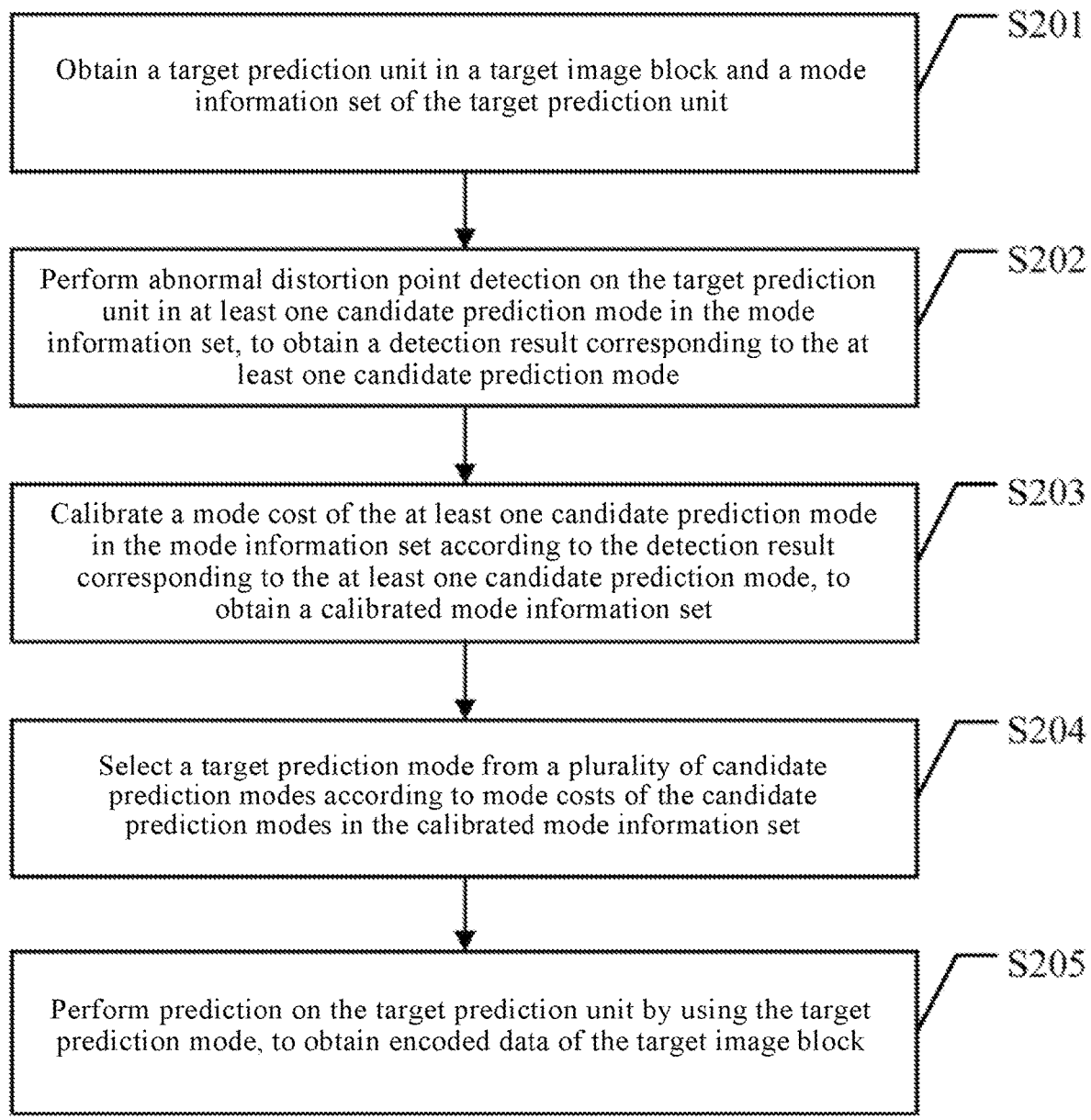
FIG. 2 is a schematic flowchart of an example video encoding method according to an embodiment of the present disclosure.

Based on the descriptions of the foregoing video encoding scheme, the embodiments of the present disclosure provide a video encoding method. The video encoding method may be performed by the video encoding device mentioned above, and specifically, may be performed by the encoder in the video encoding device. Referring to FIG. 2, the video encoding method may include steps S201 to S205 as follows:

S201: Obtain a target prediction unit in a target image block and a mode information set of the target prediction unit.

In this embodiment of the present disclosure, the target prediction unit may be any prediction unit in the target image block. The mode information set of the target prediction unit may include a plurality of candidate prediction modes and mode costs of the candidate prediction modes. The mode cost herein may be used to reflect a bit rate and a distortion brought by performing prediction on the target prediction unit by using the candidate prediction mode, and may include, but is not limited to, a rate-distortion cost. The plurality of candidate prediction modes may include at least an intra mode and an inter mode. The inter mode may include at least following modes: a first prediction mode, a second prediction modem, and a third prediction mode. The first prediction mode is a mode in which index information of a reference image block related to the target image block is to be transmitted, and specifically, may be the SKIP mode mentioned above. The second prediction mode is a mode in which residual information of the target image block and the index information of the reference image block related to the target image block are to be transmitted, and specifically, may be the ordinary Merge mode mentioned above. The third prediction mode is a mode in which the residual information of the target image block, motion vector data of the target image block, and the index information of the reference image block related to the target image block are to be transmitted, and specifically, may be the AMVP mode mentioned above.

S202: Perform abnormal distortion point detection on the target prediction unit in at least one candidate prediction mode in the mode information set, to obtain a detection result corresponding to the at least one candidate prediction mode.

In a specific implementation, abnormal distortion point detection may be performed on the target prediction unit in candidate prediction modes in the mode information set, to obtain detection results corresponding to the candidate prediction modes. That is, in such a specific implementation, the at least one candidate prediction mode may include an intra mode and an inter mode. A detection result of each candidate prediction mode may be used to indicate whether there is an abnormal distortion point in the target prediction unit in the candidate prediction mode. Specifically, descriptions are provided by using a reference prediction mode as an example. The reference prediction mode may be any candidate prediction mode. Pixel value prediction is performed on pixels in the target prediction unit by using a reference prediction mode, to obtain predicted values of the pixels; absolute values of residuals between pixel values and the predicted values of the pixels in the target prediction unit are calculated; when there is a pixel of which an absolute value of a residual is greater than a target threshold in the target prediction unit, it is determined that a detection result corresponding to the reference prediction mode indicates that there is an abnormal distortion point in the target prediction unit in the reference prediction mode; and when there is no pixel of which an absolute value of a residual is greater than the target threshold in the target prediction unit, it is determined that the detection result corresponding to the reference prediction mode indicates that there is no abnormal distortion point in the target prediction unit in the reference prediction mode.

In another specific implementation, the research shows that a probability of generating an abnormal distortion point is relatively small due to use of the intra mode for prediction; and a probability of generating an abnormal distortion point is relatively large due to use of the inter mode, particularly, the SKIP mode in the inter mode, for prediction When prediction is performed by using the SKIP mode, an MV is derived from another reference image block, and no residual information is transmitted. Therefore, although the SKIP mode can greatly save the bit rate and improve the encoding efficiency, in some special scenarios (such as a screen sharing scenario and a live streaming scenario), it is easy to cause an excessively large distortion at a local point, resulting in a relatively high probability of generating an abnormal distortion point in the target image block. Based on this research result, in this embodiment of the present disclosure, abnormal distortion point detection is performed on the target prediction unit only in the modes included in the inter mode, to obtain detection results corresponding to the modes included in the inter mode, that is, at least one candidate prediction mode may be the inter mode. In this way, because no detection is performed in the intra mode, operations of performing abnormal distortion point detection on the target prediction unit in the intra mode can be reduced, thereby effectively saving processing resources and improving an encoding speed.

It can be learned from the above that the abnormal distortion point refers to a pixel of which an absolute value of a difference between a pixel value obtained through decoding and a pixel value before encoding is greater than a specific threshold. Therefore, in an implementation, in this embodiment of the present disclosure, the difference between the predicted value of the pixel and the actual pixel value (for example, the pixel value before encoding) may be used to determine whether the pixel is an abnormal pixel. Based on this, a detection principle of performing abnormal distortion point detection on the target prediction unit in any candidate prediction mode is as follows: performing pixel value prediction on pixels in the target prediction unit by using any candidate prediction mode, and determining, when there is at least one pixel of which a difference between a predicted value and an actual pixel value is relatively large, that there is an abnormal distortion point in the target prediction unit in the any candidate prediction mode; and determining, when differences between predicted values and actual pixel values of pixels are all relatively small, that there is no abnormal distortion point in the target prediction unit in the any candidate prediction mode.

In another implementation, when the at least one candidate prediction mode is an inter mode, whether a pixel is an abnormal pixel may alternatively be determined according to a difference between a motion compensation value to the pixel and an actual pixel value (that is, a pixel value before encoding), to improve the accuracy of a detection result. The motion compensation value herein is equal to a sum of a predicted value of a pixel and a residual obtained after inverse transformation and inverse quantization are performed on residual information. Because residual information is not transmitted in the first prediction mode, a motion compensation value of a pixel in the first prediction mode is equal to a predicted value of the pixel in first prediction mode. Based on this, a detection principle of performing abnormal distortion point detection on the target prediction unit in any mode in the inter mode may alternatively be as follows: performing pixel value prediction on pixels in the target prediction unit by using the any mode, and calculating motion compensation values of the pixels according to predicted values of the pixels and residual information; determining, when there is at least one pixel of which a difference between a motion compensation value and an actual pixel value is relatively large, that there is an abnormal distortion point in the target prediction unit in the any mode; and determining, when differences between motion compensation values and actual pixel values of pixels are all relatively small, that there is no abnormal distortion point in the target prediction unit in the any mode.

S203: Calibrate a mode cost of the at least one candidate prediction mode in the mode information set according to the detection result corresponding to the at least one candidate prediction mode, to obtain a calibrated mode information set.

In a specific implementation, detection results of candidate prediction modes in at least one candidate prediction mode that is detected may be traverse sequentially. In each traversal procedure, a mode cost of at least one candidate prediction mode currently being traversed in the mode information set may be calibrated according to a detection result corresponding to the at least one candidate prediction mode currently being traversed. Specifically, when the detection result of the candidate prediction mode currently being traversed indicates that there is no abnormal distortion point in the target prediction unit in the candidate prediction mode currently being traversed, a mode cost of the candidate prediction mode currently being traversed is maintained unchanged in the mode information set. That is, in this case, a calibrated mode cost of the candidate prediction mode currently being traversed is the same as the mode cost before calibration. When the detection result of the candidate prediction mode currently being traversed indicates that there is an abnormal distortion point in the target prediction unit in the candidate prediction mode currently being traversed, at least one of the following penalty processing is performed on a mode cost of the candidate prediction mode currently being traversed in the mode information set: amplifying the mode cost of the candidate prediction mode currently being traversed and adding a disable flag for the candidate prediction mode currently being traversed. That is, in this case, a calibrated mode cost of the candidate prediction mode currently being traversed may be the same as or different from the mode cost before calibration. The foregoing traversal steps are iterated until all candidate prediction modes that are detected in step S202 are traversed, so that a calibrated mode information set can be obtained. The calibrated mode information set may include calibrated mode costs of the candidate prediction modes that are detected in step S202 and mode costs of candidate prediction modes that are not detected in step S202.

S204: Select a target prediction mode from the plurality of candidate prediction modes according to the mode costs of the candidate prediction modes in the calibrated mode information set.

In a specific implementation, a candidate prediction mode having the minimum mode cost in the calibrated mode information set may be selected from the plurality of candidate prediction modes as the target prediction mode. In some example implementations, when the candidate prediction mode having the minimum mode cost in the calibrated mode information set has a disable flag, a candidate prediction mode having the second minimum (that is, the second least) mode cost in the calibrated mode information set is selected as the target prediction mode. Further, when the candidate prediction mode having the second minimum mode cost in the calibrated mode information set also has a disable flag, a candidate prediction mode having the third minimum mode cost in the calibrated mode information set is selected as the target prediction mode, and so on. In another specific implementation, standby prediction modes may be first sifted from the plurality of candidate prediction modes according to the mode costs of the candidate prediction modes in the calibrated mode information set. The standby prediction mode herein refers to a candidate prediction mode of which a mode cost is greater than a cost threshold in the calibrated mode information set. The cost threshold may be set according to empirical values. Then, one standby prediction mode may be randomly selected from the sifted standby prediction mode as a target prediction mode.

S205: Perform prediction on the target prediction unit by using the target prediction mode, to obtain encoded data of the target image block.

In a specific implementation, pixel value prediction may be performed on pixels in the target prediction unit by using the target prediction mode, to obtain a prediction result of the target prediction unit. The prediction result of the target prediction unit may include the predicted values of pixels target prediction unit. Steps S201 to S205 are repeatedly iterated, to obtain prediction result of prediction units in the target image block. Then, a predicted block corresponding to the target image block is obtained by combining prediction results of the prediction units, and a residual block is obtained according to the target image block and the predicted block. Finally, transformation, quantization, and entropy encoding are performed sequentially on the residual block, to obtain encoded data of the target image block In the embodiments of the present disclosure, during encoding, abnormal distortion point detection can be first performed on the target prediction unit in at least one candidate prediction mode in the mode information set, to obtain a detection result corresponding to the at least one candidate prediction mode. Subsequently, a mode cost of the at least one candidate prediction mode in the mode information set can be calibrated according to the detection result corresponding to the at least one candidate prediction mode, so that mode costs of the candidate prediction modes in the calibrated mode information set can more accurately reflect bit rates and distortions corresponding to the corresponding candidate prediction modes. Therefore, a target prediction mode more suitable for the target prediction unit can be selected from the plurality of candidate prediction modes according to the mode costs of the candidate prediction modes in the calibrated mode information set. Prediction is then performed on the target prediction unit by using the suitable target prediction mode, to obtain encoded data of the target image block, so that a probability that a distortion appears in the target image block after encoding is reduced to some extent. In addition, because in the embodiments of the present disclosure, a suitable target prediction mode is mainly selected by correcting the mode decision process to reduce the distortion probability, the image compression quality and the subjective quality of the target image block are effectively improved without affecting compression efficiency and encoding complexity.

Figure 3:
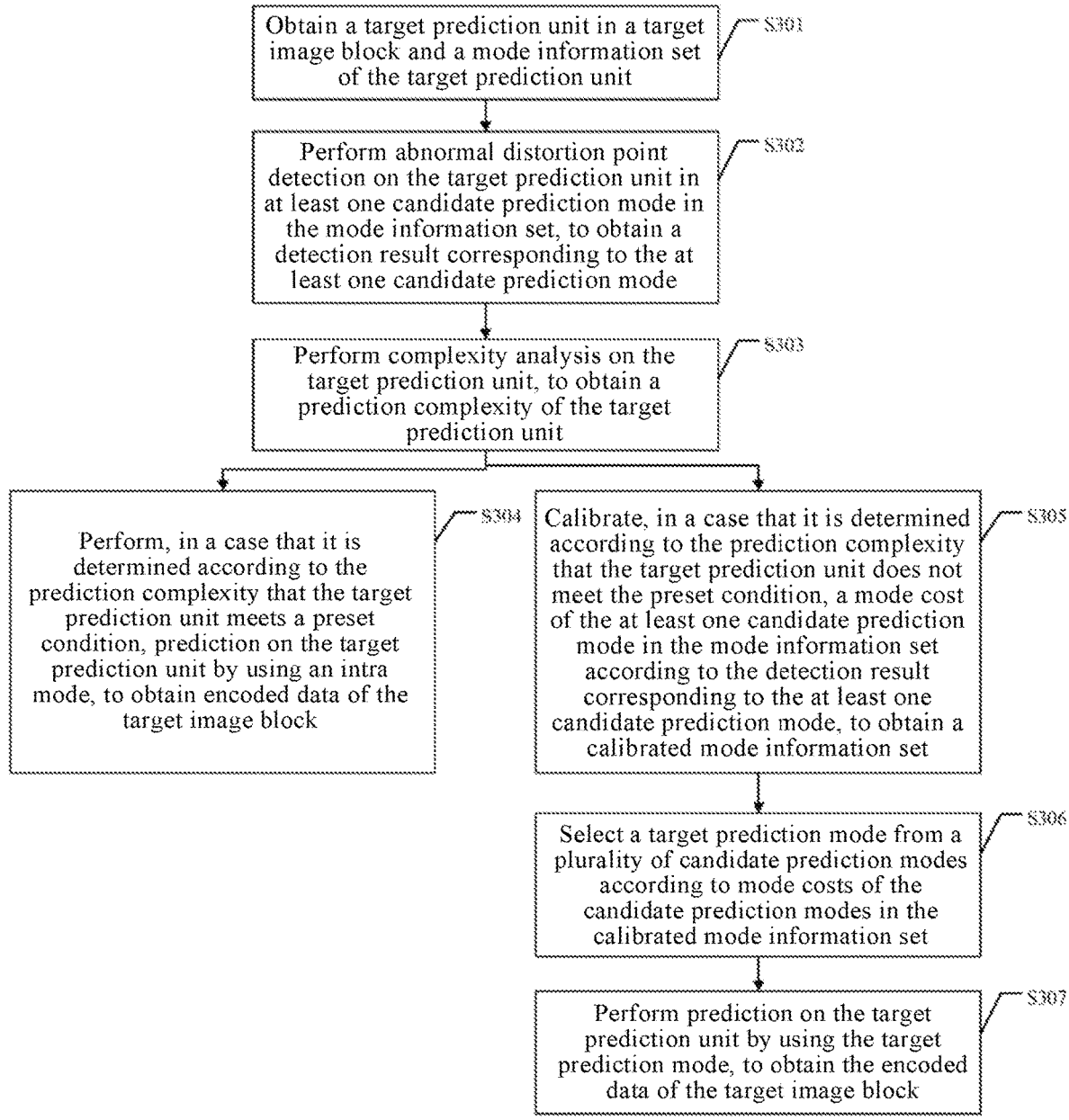
FIG. 3 is a schematic flowchart of an example video encoding method according to an embodiment of the present disclosure.

FIG. 3 is a schematic flowchart of another video encoding method according to an embodiment of the present disclosure. The video encoding method may be performed by the video encoding device mentioned above, and specifically, may be performed by the encoder in the video encoding device. Referring to FIG. 3, the video encoding method may include steps S301 to S307 as follows:

S301: Obtain a target prediction unit in a target image block and a mode information set of the target prediction unit.

In a specific implementation, the target image block may be divided into at least one prediction unit. Then, a prediction unit without being pre-processed is selected from the at least one prediction unit as the target prediction unit. After the target prediction unit is determined, a mode information set matching the target prediction unit may be further obtained. It can be learned from the above that if a mode information set of the target prediction unit may include a plurality of candidate prediction modes and mode costs of the candidate prediction modes, correspondingly, a specific implementation of obtaining a mode information set matching the target prediction unit may be as follows:

First, a plurality of candidate prediction modes matching the target prediction unit may be determined. Specifically, whether the target image block belongs to an intra slice (I Slice) is determined. Because the I Slice usually includes only an I macroblock, and the I macroblock can only use an encoded pixel in a current frame of image as a reference for intra prediction, when the target image block belongs to the I Slice, prediction can be performed on the target prediction unit by directly using the intra mode without performing the subsequent steps. When the target image block does not belong to the I Slice, indicating that any mode in the intra mode or inter mode may be used for performing prediction on the target prediction unit. Therefore, modes in the intra mode and the inter mode may be selected as a plurality of candidate prediction modes matching the target prediction unit. After the plurality of candidate prediction modes are determined, mode costs of the candidate prediction modes may be respectively calculated by using a cost function. The cost function herein may include, but is not limited to, a cost function of a rate-distortion optimized (RDO) mode, for example, a cost function shown in a formula 1.1 below, a cost function of a non-RDO mode, for example, a cost function shown in a formula 1.2 below, and the like. Then, the calculated mode costs of the candidate prediction modes and the corresponding candidate prediction modes are added to the mode information set.

$$\text{cost} = HAD + \lambda * R \qquad \text{Formula 1.1}$$

$$\text{cost} = SAD + 4R * \lambda(QP) \qquad \text{Formula 1.2}$$

In the formula 1.1, cost represents a mode cost of a candidate prediction mode; HAD represents a sum of absolute values of coefficients of residual signals of the target prediction unit after Hadamard transformation; and λ represents a Lagrangian coefficient, and R represents a quantity of bits required for encoding a candidate prediction mode (that is, a bit rate). In the formula 1.2, cost still represents a mode cost of a candidate prediction mode; SAD represents a sum of absolute values of differences between prediction results obtained by performing pixel value prediction on pixels in the target prediction unit by using the candidate prediction mode and the target prediction unit; 4R represents a quantity of bits predicted after the candidate prediction mode is used; and λ(QP) represents an exponential function associated with a quantization parameter (QP). The foregoing formulas 1.1 and 1.2 are only used to exemplify the cost function instead of exhaustively enumerating the cost function.

S302: Perform abnormal distortion point detection on the target prediction unit in at least one candidate prediction mode in the mode information set, to obtain a detection result corresponding to the at least one candidate prediction mode.

In this embodiment of the present disclosure, an example in which the at least one candidate prediction mode is an inter mode is used for description. The inter mode may include at least following modes: a first prediction mode (SKIP mode), a second prediction modem (ordinary Merge mode), and a third prediction mode (AMVP mode). Because principles of performing abnormal distortion point detection on the target prediction unit in the modes in the inter mode are similar, for the convenience of description, an implementation of step S302 is described below by using the reference prediction mode as an example. The reference prediction mode is any mode in the inter mode. That is, the reference prediction mode may be the first prediction mode, the second prediction mode, or the third prediction mode.

In a specific implementation, abnormal distortion point detection may be performed by using a formula 1.3 below:

$$\text{ABS}(DIFF(x, y)) > TH \qquad \text{Formula 1.3}$$

In the formula 1.3 above, DIFF(x, y) represents a residual (that is, a difference) between an actual pixel value and a predicted value of a pixel at a position (x, y) in the target prediction unit; and ABS represents taking an absolute value, and TH represents a target threshold. When an absolute value of the residual between the actual pixel value and the predicted value of the pixel at the position (x, y) in the target prediction unit is greater than the target threshold, it can be determined that the pixel is an abnormal pixel. Otherwise, it can be determined that the pixel is a normal pixel. Based on this, in a specific process of performing step S302, pixel value prediction is first performed on pixels in the target prediction unit by using a reference prediction mode, to obtain predicted values of the pixels. Subsequently, absolute values of residuals between pixel values and the predicted values of the pixels in the target prediction unit may be calculated. When there is a pixel of which an absolute value of a residual is greater than a target threshold in the target prediction unit, it is determined that a detection result corresponding to the reference prediction mode indicates that there is an abnormal distortion point in the target prediction unit in the reference prediction mode. When there is no pixel of which an absolute value of a residual is greater than the target threshold in the target prediction unit, it is determined that the detection result corresponding to the reference prediction mode indicates that there is no abnormal distortion point in the target prediction unit in the reference prediction mode.

The target threshold may be obtained in at least the following two manners: In an implementation, the target threshold mentioned above may be set to a uniform fixed value according to empirical values. That is, in this case, regardless of whether the reference prediction mode is a first prediction mode, a second prediction mode, or a third prediction mode, the same target threshold is always used for performing abnormal distortion point. In another implementation, because residual information needs to be transmitted in the second prediction mode and the third prediction mode, detection standards for an abnormal distortion point in the second prediction mode and the third prediction mode may be relaxed a little. In this case, target threshold may be set for different reference prediction modes according to empirical values. That is, the target threshold may be associated with the reference prediction mode. Specifically, when the reference prediction mode is the first prediction mode in the inter mode, the target threshold is equal to a first threshold, the first threshold being greater than an invalid value and less than a maximum of a pixel value range. The invalid value may be set according to an empirical value, for example, be set to 0. The maximum of the pixel value range may be determined according to a pixel bit width, the so-called the pixel bit width referring to a quantity of pixels being transmitted or displayed at a time. That is, a value range of the first threshold (TH1) may be 0<TH1<(2<<(BITDEPTH)), where BITDEPTH represents a pixel bit width (or depth), <<represents a power operation, and 2<<(BITDEPTH) represents a maximum of the pixel value range. For example, if the pixel bit width is 8, the maximum of the pixel value range is equal to 2 to the $8^{th}$ power (that is, 256). Therefore, the first threshold may be any value in a range of 0 to 256. For example, the first threshold is set to 30. When the reference prediction mode is the second prediction mode or the third prediction mode in the inter mode, the target threshold is equal to a second threshold, the second threshold being greater than or equal to the first threshold and less than the maximum of the pixel value range. That is, a value range of the second threshold (TH2) may be TH1=<TH2<(2<<(BITDEPTH)).

In another specific implementation, in a specific process of performing step S302, alternatively, pixel value prediction may be first performed on pixels in the target prediction unit by using a reference prediction mode, to obtain predicted values of the pixels, and motion compensation values of the pixels may be calculated according to predicted values of the pixels and residual information. Subsequently, absolute values of differences between motion pixel values and the motion compensation values of the pixels in the target prediction unit may be calculated. When there is a pixel of which an absolute value of a difference is greater than a target threshold in the target prediction unit, it is determined that a detection result corresponding to the reference prediction mode indicates that there is an abnormal distortion point in the target prediction unit in the reference prediction mode. When there is no pixel of which an absolute value of a difference is greater than a target threshold in the target prediction unit, it is determined that a detection result corresponding to the reference prediction mode indicates that there is no abnormal distortion point in the target prediction unit in the reference prediction mode. The target thresholds in this implementation may be set to a uniform fixed value.

S303. Perform complexity analysis on the target prediction unit, to obtain a prediction complexity of the target prediction unit.

In a specific implementation, a gradient operation may be performed on the pixel values included in the target prediction unit, to obtain an image gradient value of the target prediction unit; and the image gradient value is used as the prediction complexity of the target prediction unit. In a specific implementation, a variance operation or a mean operation may be performed on the pixel values included in the target prediction unit, and the variance or mean obtained through the operation is used as the prediction complexity of the target prediction unit. It is to be understood that, in this embodiment of the present disclosure, only two specific implementations of complexity analysis are exemplified for illustration instead of exhaustive enumeration. After the prediction complexity of the target prediction unit is obtained through analysis, whether the target prediction unit meets a preset condition may be determined according to the prediction complexity. The preset condition may include at least: the prediction complexity is less than or equal to the complexity threshold, and there is an abnormal distortion point in the target prediction unit in at least one mode in the inter mode. If the preset condition is met, step S304 may be performed. If the preset condition is not met, steps S305 to S308 may be performed. In view of the above, in this embodiment of the present disclosure, priori information, such as the prediction complexity, may be added, so that when it is determined according to the prediction complexity that the target prediction unit meets the preset condition, decision-making processes of other modes can be skipped, and intra prediction is directly performed. In this way, a decision-making process for a mode may be effectively accelerated, thereby improving the encoding speed.

S304: Perform, when it is determined according to the prediction complexity that the target prediction unit meets a preset condition, prediction on the target prediction unit by using the intra mode, to obtain encoded data of the target image block.

S305: Calibrate, when it is determined according to the prediction complexity that the target prediction unit does not meet the preset condition, a mode cost of the at least one candidate prediction mode in the mode information set according to the detection result corresponding to the at least one candidate prediction mode, to obtain a calibrated mode information set.

Principles of calibrating mode costs of candidate prediction modes according to detection results of the candidate prediction modes are similar. Therefore, for the convenience of description, an implementation of step S305 is described below by using a reference prediction mode as an example. The reference prediction mode is any mode in the inter mode. That is, the reference prediction mode may be the first prediction mode, the second prediction mode, or the third prediction mode. In a specific implementation, a mode cost of the reference prediction mode in the mode information set is maintained unchanged when the detection result corresponding to the reference prediction mode indicates that there is no abnormal distortion point in the target prediction unit in the reference prediction mode, to obtain the calibrated mode information set. When the detection result corresponding to the reference prediction mode indicates that there is an abnormal distortion point in the target prediction unit in the reference prediction mode, the mode cost of the reference prediction mode in the mode information set is adjusted by using a cost adjustment policy in the reference prediction mode, to obtain the calibrated mode information set. Specifically, when the reference prediction mode is the second prediction mode or the third prediction mode, the adjusting the mode cost of the reference prediction mode in the mode information set by using a cost adjustment policy in the reference prediction mode may include: amplifying the mode cost of the reference prediction mode by using a penalty factor, to obtain a calibrated mode cost of the reference prediction mode. The penalty factor is any value greater than 0, and a specific value thereof may be set according to an empirical value. In this case, when the target prediction mode selected subsequently through step S306 is the second prediction mode or the third prediction mode, the video encoding device (or the encoder) may alternatively be forced to transmit residuals of the pixels in the target image block that has not been transformed or quantized to the decoder, so that the decoder can conveniently perform decoding according to the residuals.

When the reference prediction mode is the first prediction mode, the adjusting the mode cost of the reference prediction mode in the mode information set by using a cost adjustment policy in the reference prediction mode may alternatively include the following implementations:

In a first implementation, a preset cost may be obtained. The preset cost is greater than mode costs of candidate prediction modes in the calibrated mode information set other than the first prediction mode and is greater than a mode cost of the first prediction mode in the mode information set (that is, greater than a mode cost of the first prediction mode before calibration). Then, the mode cost of the reference prediction mode is adjusted to the preset cost in the mode information set. In this implementation, a specific implementation of step S306 may be directly selecting a candidate prediction mode having the minimum mode cost in the calibrated mode information set from the plurality of candidate prediction modes as the target prediction mode. In view of the above, in this implementation, when there is an abnormal distortion point in the target prediction unit in the first prediction mode, a mode cost of the first prediction mode may be set to an infinite value, so that the first prediction mode is not selected when the target prediction mode is selected in ascending order according to the mode cost.

In a second implementation, the mode cost of the first prediction mode in the mode information set may be maintained unchanged, and a disable flag is added for the first prediction mode, the disable flag indicating forbidding using the first prediction mode to perform prediction on the target prediction unit. In this implementation, a specific implementation of step S306 may be using a candidate prediction mode having the minimum mode cost as the target prediction mode when the candidate prediction mode having the minimum mode cost in the calibrated mode information set is not the first prediction mode, or the candidate prediction mode having the minimum mode cost in the calibrated mode information set is the first prediction mode, and the first prediction mode does not have the disable flag. When the candidate prediction mode having the minimum mode cost in the calibrated mode information set is the first prediction mode, and the first prediction mode has the disable flag, a candidate prediction mode having the second minimum mode cost in the calibrated mode information set may be selected as the target prediction mode. In view of the above, in this implementation, when there is an abnormal distortion point in the target prediction unit in the first prediction mode, the first prediction mode may be prevented, in a manner of adding a disable flag, from being selected in a subsequent target prediction mode selection.

In a third implementation, a mode cost of the first prediction mode in the mode information set may be maintained unchanged, and no processing is performed on the first prediction mode. In this implementation, a specific implementation of step S306 may be directly using a candidate prediction mode having the minimum mode cost as the target prediction mode when the candidate prediction mode having the minimum mode cost in the calibrated mode information set is not the first prediction mode. When the candidate prediction mode having the minimum mode cost in the calibrated mode information set is the first prediction mode, a detection result of the first prediction mode may be queried for again. When the detection result corresponding to the first prediction mode indicates that there is an abnormal distortion point in the target prediction unit in the first prediction mode, a candidate prediction mode having the second minimum mode cost in the calibrated mode information set may be selected as the target prediction mode. When the detection result corresponding to the first prediction mode indicates that there is no abnormal distortion point in the target prediction unit in the first prediction mode, the first prediction mode is used as the target prediction mode.

S306: Select a target prediction mode from the plurality of candidate prediction modes according to the mode costs of the candidate prediction modes in the calibrated mode information set.

S307: Perform prediction on the target prediction unit by using the target prediction mode, to obtain the encoded data of the target image block.

In the embodiments of the present disclosure, during encoding, abnormal distortion point detection can be first performed on the target prediction unit in at least one candidate prediction mode in the mode information set, to obtain a detection result corresponding to the at least one candidate prediction mode. Subsequently, a mode cost of the at least one candidate prediction mode in the mode information set can be calibrated according to the detection result corresponding to the at least one candidate prediction mode, so that mode costs of the candidate prediction modes in the calibrated mode information set can more accurately reflect bit rates and distortions corresponding to the corresponding candidate prediction modes. Therefore, a target prediction mode more suitable for the target prediction unit can be selected from the plurality of candidate prediction modes according to the mode costs of the candidate prediction modes in the calibrated mode information set. Prediction is then performed on the target prediction unit by using the suitable target prediction mode, to obtain encoded data of the target image block, so that a probability that a distortion appears in the target image block after encoding is reduced to some extent. In addition, because in the embodiments of the present disclosure, a suitable target prediction mode is mainly selected by correcting the mode decision process to reduce the distortion probability, the image compression quality and the subjective quality of the target image block are effectively improved without affecting compression efficiency and encoding complexity.

Figure 4:
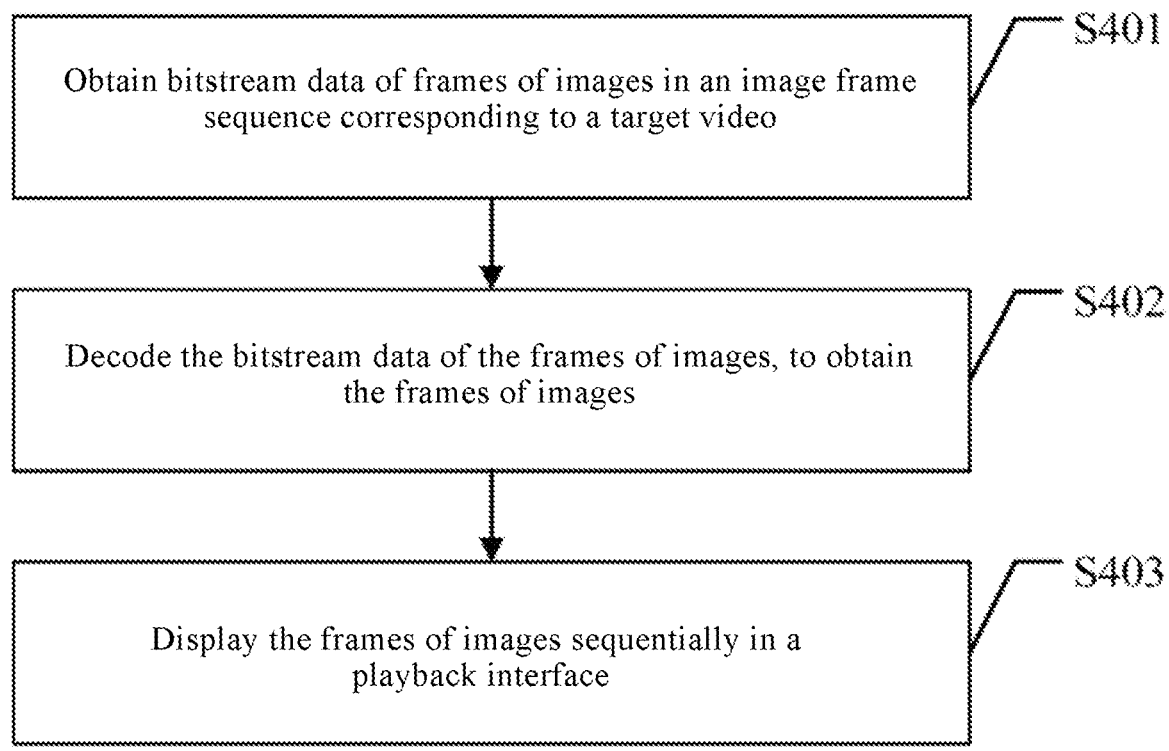
FIG. 4 is a schematic flowchart of an example video playback method according to an embodiment of the present disclosure.

Based on the related descriptions on the embodiments of the video encoding method, the embodiments of the present disclosure further provide a video playback method. The video playback method may be performed by the video playback device mentioned above. Referring to FIG. 4, the video playback method may include following steps S401 to S403:

S401: Obtain bitstream data of frames of images in an image frame sequence corresponding to a target video.

The target video may include, but is not limited to, a screen sharing video, a web conferencing video, a webcasting video, a film or television drama video, a short video, and the like. Bitstream data of each frame of image in an image frame sequence corresponding to a target video including encoded data of a plurality of image blocks. In addition, encoded data of image blocks in frames of images in the image frame sequence other than the first frame of image may all be obtained by using the foregoing video encoding method as shown in FIG. 2 or FIG. 3;

In a specific implementation, the video playback device may obtain, from the video encoding device, bitstream data of frames of images in an image frame sequence corresponding to a target video. In an implementation, the bitstream data of the frames of images in the image frame sequence corresponding to the target video may be obtained through encoding in real time. In this case, the video playback device can obtain bitstream data of frames of images from the video encoding device in real time. That is, in this implementation, each time the video encoding device obtains bitstream data of a frame of image, the video encoding device can transmit the bitstream data of the frame of image to the video playback device for decoding and playback. In another implementation, the bitstream data of the frames of images in the image frame sequence corresponding to the target video may be obtained in advance through offline encoding. In this case, the video playback device can obtain bitstream data of frames of images in the image frame sequence from the video encoding device at a time. That is, in this implementation, after the video encoding device obtains bitstream data of all frames of images, the video encoding device can transmit the bitstream data of all the frames of images to the video playback device for decoding and playback.

S402: Decode the bitstream data of the frames of images, to obtain the frames of images.

S403: Display the frames of images sequentially in a playback interface.

For specific implementations of steps S402 and S403, reference may be made to related content in the decoding stage mentioned in the foregoing image processing procedure, and details are not described herein again. When the bitstream data of the frames of images in the image frame sequence corresponding to the target video is decoded in real time and transmitted to the video playback device in real time, each time the video playback device receives bitstream data of a frame of image, the video playback device can perform steps S402 and S403, to display the frame of image in real time, thereby playing the target video in real time.

In the embodiments of the present disclosure, bitstream data of frames of images in an image frame sequence corresponding to a target video may be obtained first, bitstream data of each frame of image including encoded data of a plurality of image blocks. Then, the bitstream data of the frames of images may be decoded, to obtain the frames of images; and the frames of images are displayed sequentially in a playback interface. Encoded data of image blocks in frames of images in the image frame sequence corresponding to the target video other than the first frame of image being obtained by using the foregoing video encoding method. Therefore, a probability that a distortion appears in image blocks can be effectively reduced, so that when frames of images are displayed in the playback interface, a probability that a dirty spot appears in the frames of images can be reduced to some extent, thereby improving the subjective quality of the frames of images.

Figure 5:
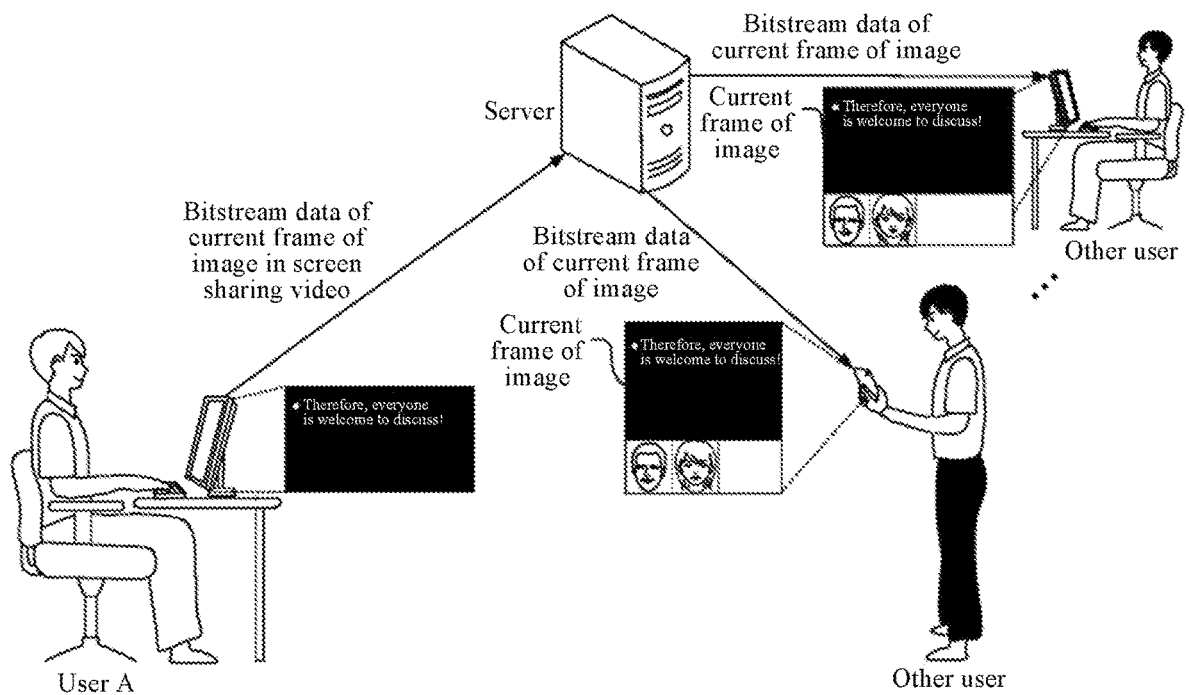
FIG. 5 is a diagram of an application scenario of a video encoding method and a video playback method according to an example embodiment of the present disclosure.

It is to be understood that the video encoding method and the video playback method provided in the embodiments of the present disclosure may be applied to various application scenarios: for example, a screen sharing scenario in a video conference, a live video streaming scenario, and a film or television drama video playback scenario. Using a screen sharing scenario in a video conference as an example, specific applications of the video encoding method and the video playback method provided in the embodiments of the present disclosure are described below:

In a process in which a plurality of users have a video conference by using communication clients with a video conferencing function (such as an enterprise WeChat client or a Tencent conference client), when a user A wants to share his/her screen content with other users, he/she may enable a screen sharing function. After detecting that the screen sharing function is enabled, a first communication client used by user A may obtain displayed content in a terminal screen corresponding to the user A in real time, and generate a current frame of image of a screen sharing video according to the displayed content obtained in real time. Then, the first communication client may encode the current frame of image, to obtain bitstream data of the current frame of image. Specifically, the current frame of image may be divided into a plurality of image blocks, and the image blocks are encoded by using the video encoding method shown in FIG. 2 or FIG. 3, to obtain encoded data of the image blocks. In addition, the encoded data of the image blocks is combined to obtain the bitstream data of the current frame of image. After obtaining the bitstream data of the current frame of image, the first communication client may transmit the bitstream data of the current frame of image through the server to a second communication client used by the other users. Correspondingly, after receiving the bitstream data of the current frame of image sent by the first communication client, the second communication client used by the other users may decode the bitstream data of the current frame of image by using the video playback method shown in FIG. 4, to obtain the current frame of image, and display the current frame of image in a user interface, as shown in FIG. 5.

In view of the above, using the video encoding method and the video playback method provided in the embodiments of the present disclosure can effectively reduce the probability that an abnormal distortion point appears in the screen sharing scenario, and can effectively improve the video compression quality of a screen sharing video, to improve the subjective quality of the screen sharing video.

Based on the foregoing description of the embodiment of the video encoding method, the embodiments of this disclosure further disclose a video encoding apparatus. The video encoding apparatus may be a computer-readable instruction (including program code) run on a video encoding device. The video encoding apparatus may perform the method shown in FIG. 2 and FIG. 3.

The term unit (and other similar terms such as module, submodule, subunit, etc.) in this disclosure may refer to a software module, a hardware module, or a combination thereof. A software module (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more modules. Moreover, each module can be part of an overall unit that includes the functionalities of the unit.

Figure 6:
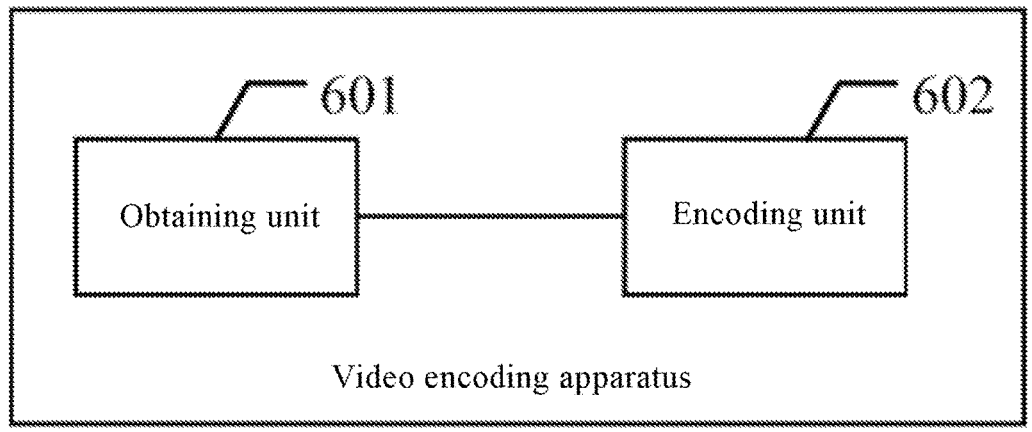
FIG. 6 is a schematic structural diagram of an example video encoding apparatus according to an embodiment of the present disclosure.

Referring to FIG. 6, the following units may be run on the video encoding apparatus:

an obtaining unit 601, configured to obtain a target prediction unit in a target image block and a mode information set of the target prediction unit, the mode information set including a plurality of candidate prediction modes and mode costs of the candidate prediction modes; and an encoding unit 602, configured to perform abnormal distortion point detection on the target prediction unit in at least one candidate prediction mode in the mode information set, to obtain a detection result corresponding to the at least one candidate prediction mode.

The encoding unit 602 is further configured to calibrate a mode cost of the at least one candidate prediction mode in the mode information set according to the detection result corresponding to the at least one candidate prediction mode, to obtain a calibrated mode information set.

The encoding unit 602 is further configured to select a target prediction mode from the plurality of candidate prediction modes according to the mode costs of the candidate prediction modes in the calibrated mode information set.

The encoding unit 602 is further configured to perform prediction on the target prediction unit by using the target prediction mode, to obtain encoded data of the target image block.

In an implementation, the at least one candidate prediction mode is an inter mode, the inter mode including at least one of the following modes: a first prediction mode, a second prediction mode, or a third prediction mode.

The first prediction mode is a mode in which index information of a reference image block related to the target image block is to be transmitted.

The second prediction mode is a mode in which residual information of the target image block and the index information of the reference image block related to the target image block are to be transmitted.

The third prediction mode is a mode in which the residual information of the target image block, motion vector data of the target image block, and the index information of the reference image block related to the target image block are to be transmitted.

In another implementation, in response to performing abnormal distortion point detection on the target prediction unit in at least one candidate prediction mode in the mode information set, to obtain a detection result corresponding to the at least one candidate prediction mode, the encoding unit 602 may be further configured to:
  perform pixel value prediction on pixels in the target prediction unit by using a reference prediction mode, to obtain predicted values of the pixels, the reference prediction mode being any mode in the inter mode, or the reference prediction mode being any one of the at least one candidate prediction mode;
  calculate absolute values of residuals between pixel values and the predicted values of the pixels in the target prediction unit;
  determine, when there is a pixel of which an absolute value of a residual is greater than a target threshold in the target prediction unit, that a detection result corresponding to the reference prediction mode indicates that there is an abnormal distortion point in the target prediction unit in the reference prediction mode; and
  determine, when there is no pixel of which an absolute value of a residual is greater than the target threshold in the target prediction unit, that the detection result corresponding to the reference prediction mode indicates that there is no abnormal distortion point in the target prediction unit in the reference prediction mode.

In another implementation, the target threshold is associated with the reference prediction mode.

When the reference prediction mode is the first prediction mode in the inter mode, the target threshold is equal to a first threshold. The first threshold is greater than an invalid value and less than a maximum of a pixel value range.

When the reference prediction mode is the second prediction mode or the third prediction mode in the inter mode, the target threshold is equal to a second threshold. The second threshold is greater than or equal to the first threshold and less than the maximum of the pixel value range.

In another implementation, in response to calibrating a mode cost of the at least one candidate prediction mode in the mode information set according to the detection result corresponding to the at least one candidate prediction mode, to obtain a calibrated mode information set, the encoding unit 602 may be further configured to:
  maintain a mode cost of the reference prediction mode in the mode information set unchanged when the detection result corresponding to the reference prediction mode indicates that there is no abnormal distortion point in the target prediction unit in the reference prediction mode, to obtain the calibrated mode information set, the reference prediction mode being any mode in the inter mode; and
  adjust, when the detection result corresponding to the reference prediction mode indicates that there is an abnormal distortion point in the target prediction unit in the reference prediction mode, the mode cost of the reference prediction mode in the mode information set by using a cost adjustment policy in the reference prediction mode, to obtain the calibrated mode information set.

In another implementation, in response to adjusting the mode cost of the reference prediction mode in the mode information set by using a cost adjustment policy in the reference prediction mode, the encoding unit 602 may be further configured to:
  amplify, when the reference prediction mode is the second prediction mode or the third prediction mode, the mode cost of the reference prediction mode by using a penalty factor, to obtain a calibrated mode cost of the reference prediction mode.

In another implementation, in response to adjusting the mode cost of the reference prediction mode in the mode information set by using a cost adjustment policy in the reference prediction mode, the encoding unit 602 may be further configured to:
  obtain a preset cost when the reference prediction mode is the first prediction mode, the preset cost being greater than mode costs of candidate prediction modes in the calibrated mode information set other than the first prediction mode and being greater than a mode cost of the first prediction mode in the mode information set; and
  adjust, in the mode information set, the mode cost of the reference prediction mode to the preset cost.

In another implementation, in response to selecting a target prediction mode from the plurality of candidate prediction modes according to the mode costs of the candidate prediction modes in the calibrated mode information set, the encoding unit 602 is further configured to:
  select, from the plurality of candidate prediction modes, a candidate prediction mode having the minimum mode cost in the calibrated mode information set as the target prediction mode.

In another implementation, in response to adjusting the mode cost of the reference prediction mode in the mode information set by using a cost adjustment policy in the reference prediction mode, the encoding unit 602 may be further configured to:
  maintain, when the reference prediction mode is the first prediction mode, a mode cost of the first prediction mode in the mode information set unchanged; and add a disable flag for the first prediction mode, the disable flag indicating forbidding using the first prediction mode to perform prediction on the target prediction unit.

In another implementation, in response to selecting a target prediction mode from the plurality of candidate prediction modes according to the mode costs of the candidate prediction modes in the calibrated mode information set, the encoding unit 602 is further configured to:

use a candidate prediction mode having the minimum mode cost as the target prediction mode when the candidate prediction mode having the minimum mode cost in the calibrated mode information set is not the first prediction mode, or the candidate prediction mode having the minimum mode cost in the calibrated mode information set is the first prediction mode, and the first prediction mode does not have the disable flag; and select, when the candidate prediction mode having the minimum mode cost in the calibrated mode information set is the first prediction mode, and the first prediction mode has the disable flag, a candidate prediction mode having the second minimum mode cost in the calibrated mode information set as target prediction mode.

In another implementation, the plurality of candidate prediction modes include an intra mode and an inter mode, the inter mode including at least one mode. Correspondingly, the encoding unit 602 may be further configured to:

perform complexity analysis on the target prediction unit, to obtain a prediction complexity of the target prediction unit;

perform, when it is determined according to the prediction complexity that the target prediction unit meets a preset condition, prediction on the target prediction unit by using the intra mode, to obtain the encoded data of the target image block, the preset condition including: the prediction complexity is less than or equal to the complexity threshold, and there is an abnormal distortion point in the target prediction unit in at least one mode in the inter mode; and perform, when it is determined according to the prediction complexity that the target prediction unit does not meet the preset condition, the operation of calibrating a mode cost of the at least one candidate prediction mode in the mode information set according to the detection result corresponding to the at least one candidate prediction mode, to obtain a calibrated mode information set.

According to an embodiment of the present disclosure, the steps involved in the method shown in FIG. 2 and FIG. 3 may all be performed by the units of the video encoding apparatus shown in FIG. 6. For example, step S201 shown in FIG. 2 may be performed by the obtaining unit 601 shown in FIG. 6, and steps S202 to S205 may be performed by the encoding unit 602 shown in FIG. 6. In another example, step S301 shown in FIG. 3 may be performed by the obtaining unit 601 shown in FIG. 6, and steps S302 to S307 may be performed by the encoding unit 602 shown in FIG. 6.

According to another embodiment of the present disclosure, units in the video encoding apparatus shown in FIG. 6 may be constituted by one or several other units separately or in complete combination, or a (some) unit(s) may be divided into multiple functionally smaller units. In this way, operations may also be implemented without affecting implementation of technical effects of the embodiments of the present disclosure. The foregoing units are divided based on logical functions. In an actual application, a function of one unit may also be implemented by a plurality of units, or functions of a plurality of units are implemented by one unit. In another embodiment of the present disclosure, the video encoding apparatus may also include another unit. During practical application, these functions may also be cooperatively implemented by another unit and may be cooperatively implemented by multiple units.

According to another embodiment of the present disclosure, computer-readable instructions (including program code) that can perform the steps in the corresponding methods shown in FIG. 2 and FIG. 3 may be run on a general computing device, such as a computer, which include processing elements and storage elements such as a central processing unit (CPU), a random access memory (RAM), and a read-only memory (ROM), to construct devices of the video encoding apparatus shown in FIG. 6, and implement the video encoding method in the embodiments of the present disclosure. The computer-readable instructions may be recorded on, for example, a computer-readable recording medium, and may be loaded into the foregoing computing device by using the computer-readable recording medium and run on the computing device.

In the embodiments of the present disclosure, during encoding, abnormal distortion point detection can be first performed on the target prediction unit in at least one candidate prediction mode in the mode information set, to obtain a detection result corresponding to the at least one candidate prediction mode. Subsequently, a mode cost of the at least one candidate prediction mode in the mode information set can be calibrated according to the detection result corresponding to the at least one candidate prediction mode, so that mode costs of the candidate prediction modes in the calibrated mode information set can more accurately reflect bit rates and distortions corresponding to the corresponding candidate prediction modes. Therefore, a target prediction mode more suitable for the target prediction unit can be selected from the plurality of candidate prediction modes according to the mode costs of the candidate prediction modes in the calibrated mode information set. Prediction is then performed on the target prediction unit by using the suitable target prediction mode, to obtain encoded data of the target image block, so that a probability that a distortion appears in the target image block after encoding is reduced to some extent. In addition, because in the embodiments of the present disclosure, a suitable target prediction mode is mainly selected by correcting the mode decision process to reduce the distortion probability, the image compression quality and the subjective quality of the target image block are effectively improved without affecting compression efficiency and encoding complexity.

Figure 7:
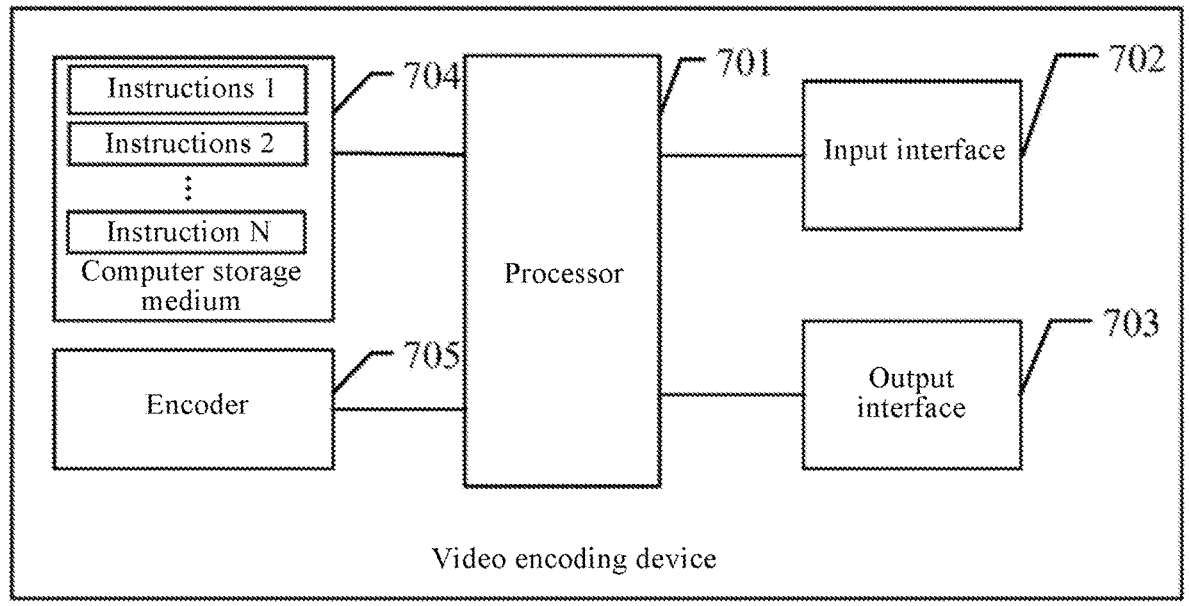
FIG. 7 is a schematic structural diagram of an example video encoding device according to an embodiment of the present disclosure.

Based on the foregoing descriptions of the embodiment of the video encoding method and the embodiment of the video encoding apparatus, the embodiments of this disclosure further provide a video encoding device. Referring to FIG. 7, the video encoding device may include at least a processor 701, an input interface 702, an output interface 703, a computer storage medium 704, and an encoder 705. The computer storage medium 704 may be stored on a memory of the video encoding device. The computer storage medium 704 is configured to store computer-readable instructions. The computer-readable instructions include program instructions. The processor 701 is configured to execute the program instructions stored on the computer storage medium 704. The processor 701 (or referred to as a central processing unit (CPU)) is a computing core and a control core of the video encoding device, is suitable for implementing one or more instructions, and is specifically suitable for loading and executing one or more instructions to implement a corresponding method procedure or a corresponding function. In an embodiment, the processor 701 provided in the embodiments of the present disclosure may be configured to perform a series of video encoding on a target image block, including: obtaining a target prediction unit in a target image block and a mode information set of the target prediction unit, the mode information set including a plurality of candidate prediction modes and mode costs of the candidate prediction modes; and performing abnormal distortion point detection on the target prediction unit in at least one candidate prediction mode in the mode information set, to obtain a detection result corresponding to the at least one candidate prediction mode; calibrating a mode cost of the at least one candidate prediction mode in the mode information set according to the detection result corresponding to the at least one candidate prediction mode, to obtain a calibrated mode information set; selecting a target prediction mode from the plurality of candidate prediction modes according to the mode costs of the candidate prediction modes in the calibrated mode information set; performing prediction on the target prediction unit by using the target prediction mode, to obtain encoded data of the target image block; and so on.

The embodiments of the present disclosure further provide a computer storage medium (memory), and the computer storage medium is a memory device in the video encoding device and is configured to store programs and data. It may be understood that the computer storage medium herein may include an internal storage medium of the video encoding device and certainly may further include an extended storage medium supported by the video encoding device. The computer storage medium provides storage space, and the storage space stores an operating system of the video encoding device. In addition, the storage space further stores one or more instructions adapted to be loaded and executed by the processor 701. The instructions may be one or more computer-readable instructions (including program code). The computer storage medium herein may be a high-speed RAM memory, or may be a non-volatile memory, such as at least one magnetic disk storage. In some example implementations, the computer storage medium may be at least one computer storage medium far away from the foregoing processor.

In another embodiment, the processor 701 may load and execute one or more instructions stored on the computer storage medium, to implement corresponding steps of the methods in the foregoing embodiments related to the video encoding method. In a specific implementation, the one or more instructions in the computer storage medium are loaded by the processor 701 to further perform the following steps:

obtaining a target prediction unit in a target image block and a mode information set of the target prediction unit, the mode information set including a plurality of candidate prediction modes and mode costs of the candidate prediction modes;

performing abnormal distortion point detection on the target prediction unit in at least one candidate prediction mode in the mode information set, to obtain a detection result corresponding to the at least one candidate prediction mode;

calibrating a mode cost of the at least one candidate prediction mode in the mode information set according to the detection result corresponding to the at least one candidate prediction mode, to obtain a calibrated mode information set;

selecting a target prediction mode from the plurality of candidate prediction modes according to the mode costs of the candidate prediction modes in the calibrated mode information set; and performing prediction on the target prediction unit by using the target prediction mode, to obtain encoded data of the target image block.

In an implementation, the at least one candidate prediction mode is an inter mode, the inter mode including at least the following modes: a first prediction mode, a second prediction mode, and a third prediction mode.

The first prediction mode is a mode in which index information of a reference image block related to the target image block is to be transmitted.

The second prediction mode is a mode in which residual information of the target image block and the index information of the reference image block related to the target image block are to be transmitted.

The third prediction mode is a mode in which the residual information of the target image block, motion vector data of the target image block, and the index information of the reference image block related to the target image block are to be transmitted.

In another implementation, in response to performing abnormal distortion point detection on the target prediction unit in at least one candidate prediction mode in the mode information set, to obtain a detection result corresponding to the at least one candidate prediction mode, the one or more first instructions are loaded and further performed by the processor 701 to:

perform pixel value prediction on pixels in the target prediction unit by using a reference prediction mode, to obtain predicted values of the pixels, the reference prediction mode being any mode in the inter mode;

calculate absolute values of residuals between pixel values and the predicted values of the pixels in the target prediction unit;

determine, when there is a pixel of which an absolute value of a residual is greater than a target threshold in the target prediction unit, that a detection result corresponding to the reference prediction mode indicates that there is an abnormal distortion point in the target prediction unit in the reference prediction mode; and determine, when there is no pixel of which an absolute value of a residual is greater than the target threshold in the target prediction unit, that the detection result corresponding to the reference prediction mode indicates that there is no abnormal distortion point in the target prediction unit in the reference prediction mode.

In another implementation, the target threshold is associated with the reference prediction mode.

When the reference prediction mode is the first prediction mode in the inter mode, the target threshold is equal to a first threshold, the first threshold being greater than an invalid value and less than a maximum of a pixel value range;

When the reference prediction mode is the second prediction mode or the third prediction mode in the inter mode, the target threshold is equal to a second threshold, the second threshold being greater than or equal to the first threshold and less than the maximum of the pixel value range.

In another implementation, in response to calibrating a mode cost of the at least one candidate prediction mode in the mode information set according to the detection result corresponding to the at least one candidate prediction mode, to obtain a calibrated mode information set, the one or more first instructions are loaded and further performed by the processor 701 to:

maintain a mode cost of the reference prediction mode in the mode information set unchanged when the detection result corresponding to the reference prediction mode indicates that there is no abnormal distortion point in the target prediction unit in the reference prediction mode, to obtain the calibrated mode information set, the reference prediction mode being any mode in the inter mode; and adjust, when the detection result corresponding to the reference prediction mode indicates that there is an abnormal distortion point in the target prediction unit in the reference prediction mode, the mode cost of the reference prediction mode in the mode information set by using a cost adjustment policy in the reference prediction mode, to obtain the calibrated mode information set.

In another implementation, in response to adjusting the mode cost of the reference prediction mode in the mode information set by using a cost adjustment policy in the reference prediction mode, the one or more first instructions are loaded and further performed by the processor 701 to:

amplify, when the reference prediction mode is the second prediction mode or the third prediction mode, the mode cost of the reference prediction mode by using a penalty factor, to obtain a calibrated mode cost of the reference prediction mode.

In another implementation, in response to adjusting the mode cost of the reference prediction mode in the mode information set by using a cost adjustment policy in the reference prediction mode, the one or more first instructions are loaded and further performed by the processor 701 to:

obtain a preset cost when the reference prediction mode is the first prediction mode, the preset cost being greater than mode costs of candidate prediction modes in the calibrated mode information set other than the first prediction mode and being greater than a mode cost of the first prediction mode in the mode information set; and adjust, in the mode information set, the mode cost of the reference prediction mode to the preset cost.

In another implementation, in response to selecting a target prediction mode from the plurality of candidate prediction modes according to the mode costs of the candidate prediction modes in the calibrated mode information set, the one or more first instructions are loaded and further performed by the processor 701 to:

select, from the plurality of candidate prediction modes, a candidate prediction mode having the minimum mode cost in the calibrated mode information set as the target prediction mode.

In another implementation, in response to adjusting the mode cost of the reference prediction mode in the mode information set by using a cost adjustment policy in the reference prediction mode, the one or more first instructions are loaded and further performed by the processor 701 to:

maintain, when the reference prediction mode is the first prediction mode, a mode cost of the first prediction mode in the mode information set unchanged; and add a disable flag for the first prediction mode, the disable flag indicating forbidding using the first prediction mode to perform prediction on the target prediction unit.

In another implementation, in response to selecting a target prediction mode from the plurality of candidate prediction modes according to the mode costs of the candidate prediction modes in the calibrated mode information set, the one or more first instructions are loaded and further performed by the processor 701 to:

use a candidate prediction mode having the minimum mode cost as the target prediction mode when the candidate prediction mode having the minimum mode cost in the calibrated mode information set is not the first prediction mode, or the candidate prediction mode having the minimum mode cost in the calibrated mode information set is the first prediction mode, and the first prediction mode does not have the disable flag; and select, when the candidate prediction mode having the minimum mode cost in the calibrated mode information set is the first prediction mode, and the first prediction mode has the disable flag, a candidate prediction mode having the second minimum mode cost in the calibrated mode information set as target prediction mode.

In another implementation, the plurality of candidate prediction modes include an intra mode and an inter mode. Correspondingly, the one or more first instructions may be loaded and further performed by the processor 701 to:

perform complexity analysis on the target prediction unit, to obtain a prediction complexity of the target prediction unit;

perform, when it is determined according to the prediction complexity that the target prediction unit meets a preset condition, prediction on the target prediction unit by using the intra mode, to obtain the encoded data of the target image block, the preset condition including: the prediction complexity is less than or equal to the complexity threshold, and there is an abnormal distortion point in the target prediction unit in at least one mode in the inter mode; and perform, when it is determined according to the prediction complexity that the target prediction unit does not meet the preset condition, the operation of calibrating a mode cost of the at least one candidate prediction mode in the mode information set according to the detection result corresponding to the at least one candidate prediction mode, to obtain a calibrated mode information set.

In the embodiments of the present disclosure, during encoding, abnormal distortion point detection can be first performed on the target prediction unit in at least one candidate prediction mode in the mode information set, to obtain a detection result corresponding to the at least one candidate prediction mode. Subsequently, a mode cost of the at least one candidate prediction mode in the mode information set can be calibrated according to the detection result corresponding to the at least one candidate prediction mode, so that mode costs of the candidate prediction modes in the calibrated mode information set can more accurately reflect bit rates and distortions corresponding to the corresponding candidate prediction modes. Therefore, a target prediction mode more suitable for the target prediction unit can be selected from the plurality of candidate prediction modes according to the mode costs of the candidate prediction modes in the calibrated mode information set. Prediction is then performed on the target prediction unit by using the suitable target prediction mode, to obtain encoded data of the target image block, so that a probability that a distortion appears in the target image block after encoding is reduced to some extent. In addition, because in the embodiments of the present disclosure, a suitable target prediction mode is mainly selected by correcting the mode decision process to reduce the distortion probability, the image compression quality and the subjective quality of the target image block are effectively improved without affecting compression efficiency and encoding complexity.

Figure 8:
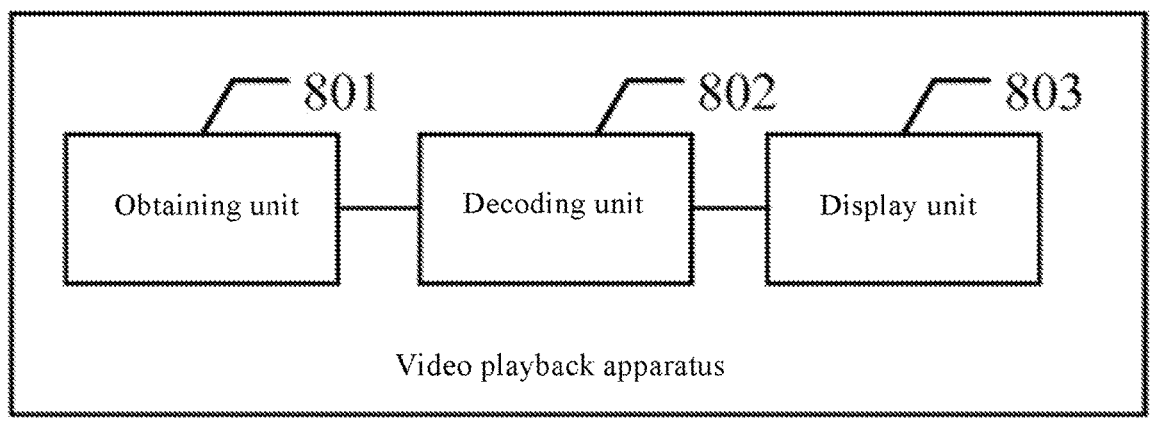
FIG. 8 is a schematic structural diagram of an example video playback apparatus according to an embodiment of the present disclosure.

Based on the foregoing description of the embodiment of the video playback method, the embodiments of this disclosure further disclose a video playback apparatus. The video playback apparatus may be a computer-readable instruction (including program code) run on a video playback device. The video playback apparatus may perform the method shown in FIG. 4. Referring to FIG. 8, the following units may be run on the video playback apparatus:

an obtaining unit 801, configured to obtain bitstream data of frames of images in an image frame sequence corresponding to a target video, bitstream data of each frame of image including encoded data of a plurality of image blocks, encoded data of image blocks in frames of images in the image frame sequence other than the first frame of image being obtained by using the video encoding method shown in FIG. 2 or FIG. 3;

a decoding unit 802, configured to decode the bitstream data of the frames of images, to obtain the frames of images; and a display unit 803, configured to display the frames of images sequentially in a playback interface.

According to an embodiment of the present disclosure, the steps involved in the method shown in FIG. 4 may all be performed by the units of the video playback apparatus shown in FIG. 8. For example, steps S401 to S403 shown in FIG. 4 may be respectively performed by the obtaining unit 801, the decoding unit 802, and the display unit 803 shown in FIG. 8. According to another embodiment of the present disclosure, units in the video playback apparatus shown in FIG. 8 may be constituted by one or several other units separately or in complete combination, or a (some) unit(s) may be divided into multiple functionally smaller units. In this way, operations may also be implemented without affecting implementation of technical effects of the embodiments of the present disclosure. The foregoing units are divided based on logical functions. In an actual application, a function of one unit may also be implemented by a plurality of units, or functions of a plurality of units are implemented by one unit. In another embodiment of the present disclosure, the video playback apparatus may also include another unit. During practical application, these functions may also be cooperatively implemented by another unit and may be cooperatively implemented by multiple units.

According to another embodiment of the present disclosure, computer-readable instructions (including program code) that can perform the steps in the corresponding methods shown in FIG. 4 may be run on a general computing device, such as a computer, which include processing elements and storage elements such as a central processing unit (CPU), a random access memory (RAM), and a read-only memory (ROM), to construct devices of the video playback apparatus shown in FIG. 8, and implement the video playback method in the embodiments of the present disclosure. The computer-readable instructions may be recorded on, for example, a computer-readable recording medium, and may be loaded into the foregoing computing device by using the computer-readable recording medium and run on the computing device.

Figure 9:
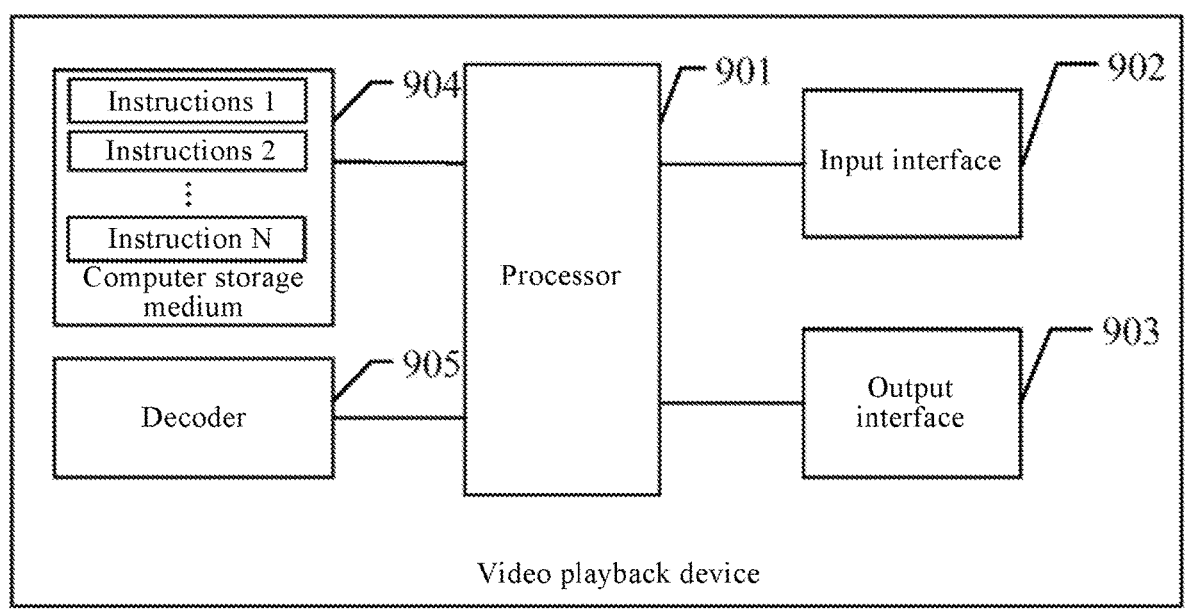
FIG. 9 is a schematic structural diagram of an example video playback device according to an embodiment of the present disclosure.

Based on the foregoing descriptions of the embodiment of the video playback method and the embodiment of the video playback apparatus, the embodiments of this disclosure further provide a video playback device. Referring to FIG. 9, the video playback device may include at least a processor 901, an input interface 902, an output interface 903, a computer storage medium 904, and a decoder 905. The computer storage medium 904 may be stored on a memory of the video playback device. The computer storage medium 904 is configured to store computer-readable instructions. The computer-readable instructions include program instructions. The processor 901 is configured to execute the program instructions stored on the computer storage medium 904. The processor 901 (or referred to as a central processing unit (CPU)) is a computing core and a control core of the video playback device, is suitable for implementing one or more instructions, and is specifically suitable for loading and executing one or more instructions to implement a corresponding method procedure or a corresponding function. In an embodiment, the processor 901 provided in the embodiments of the present disclosure may be configured to perform a series of video playback on a target video including: obtaining bitstream data of frames of images in an image frame sequence corresponding to the target video, bitstream data of each frame of image including encoded data of a plurality of image blocks, encoded data of image blocks in frames of images in the image frame sequence other than the first frame of image being obtained by using the video encoding method shown in FIG. 2 or FIG. 3; decoding the bitstream data of the frames of images, to obtain the frames of images; displaying the frames of images sequentially in a playback interface; and so on.

The embodiments of the present disclosure further provide a computer storage medium (memory), and the computer storage medium is a memory device in the video playback device and is configured to store programs and data. It may be understood that the computer storage medium herein may include an internal storage medium of the video playback device and certainly may further include an extended storage medium supported by the video playback device. The computer storage medium provides storage space, and the storage space stores an operating system of the video playback device. In addition, the storage space further stores one or more instructions adapted to be loaded and executed by the processor 901. The instructions may be one or more computer-readable instructions (including program code). The computer storage medium herein may be a high-speed RAM memory, or may be a non-volatile memory, such as at least one magnetic disk storage. In some example implementations, the computer storage medium may be at least one computer storage medium far away from the foregoing processor.

In another embodiment, the processor 901 may load and execute one or more second instructions stored on the computer storage medium, to implement corresponding steps of the methods in the foregoing embodiments related to the video playback method. In an embodiment, the one or more second instructions in the computer storage medium are loaded by the processor 901 to further perform the following steps:

obtaining bitstream data of frames of images in an image frame sequence corresponding to a target video, bitstream data of each frame of image including encoded data of a plurality of image blocks, encoded data of image blocks in frames of images in the image frame sequence other than the first frame of image being obtained by using the video encoding method shown in FIG. 2 or FIG. 3;

decoding the bitstream data of the frames of images, to obtain the frames of images; and displaying the frames of images sequentially in a playback interface.

In the embodiments of the present disclosure, bitstream data of frames of images in an image frame sequence corresponding to a target video may be obtained first, bitstream data of each frame of image including encoded data of a plurality of image blocks. Then, the bitstream data of the frames of images may be decoded, to obtain the frames of images; and the frames of images are displayed sequentially in a playback interface. Encoded data of image blocks in frames of images in the image frame sequence corresponding to the target video other than the first frame of image being obtained by using the foregoing video encoding method. Therefore, a probability that a distortion appears in image blocks can be effectively reduced, so that when frames of images are displayed in the playback interface, a probability that a dirty spot appears in the frames of images can be reduced to some extent, thereby improving the subjective quality of the frames of images.

In an embodiment, a computer device is provided, including a memory and one or more processors, the memory storing computer-readable instructions, the one or more processors, when executing the computer-readable instructions, implementing the steps in the foregoing method embodiments.

In an embodiment, one or more non-volatile computer-readable storage mediums storing computer-readable instructions are provided, the computer-readable instructions, when executed by one or more processors, implementing the steps in the foregoing method embodiments.

In an embodiment, a computer program product or a computer program is provided, the computer program product or the computer program including computer-readable instructions, the computer-readable instructions being stored on a computer-readable storage medium, a processor of a computer device reading the computer-readable instructions from the computer-readable storage medium, and the processor executing the computer-readable instructions to cause the computer device to perform the steps in the method embodiments.

Disclosed above are merely exemplary embodiments of the present disclosure, and are certainly not intended to limit the patent scope of the present disclosure. Therefore, an equivalent change made according to the claims of the present disclosure still falls within the scope of the present disclosure.

What is claimed is:

1. A video encoding method, comprising:
obtaining a target prediction unit in a target image block and a mode information set of the target prediction unit, the mode information set comprising a plurality of candidate prediction modes and mode costs of the candidate prediction modes for the target prediction unit;
performing abnormal distortion point detection on the target prediction unit in at least one candidate prediction mode in the mode information set, to obtain a detection result corresponding to the at least one candidate prediction mode by:
  performing pixel value prediction on pixels in the target prediction unit by using a reference prediction mode, to obtain predicted values of the pixels, the reference prediction mode being any one of the at least one candidate prediction mode;
  calculating absolute values of residuals between pixel values and the predicted values of the pixels in the target prediction unit;
  determining, when there is a pixel having an absolute value of residual greater than a target threshold in the target prediction unit, that the detection result corresponding to the reference prediction mode indicates that there is an abnormal distortion point in the target prediction unit in the reference prediction mode; and
  determining, when there is no pixel having an absolute value of residual greater than the target threshold in the target prediction unit, that the detection result corresponding to the reference prediction mode indicates that there is no abnormal distortion point in the target prediction unit in the reference prediction mode;
calibrating at least one of the mode costs corresponding to the at least one candidate prediction mode in the mode information set according to the detection result to obtain calibrated mode costs of the candidate prediction modes and a calibrated mode information set comprising the plurality of candidate prediction modes and calibrated mode costs of the candidate prediction modes;
selecting a target prediction mode from the plurality of candidate prediction modes according to the calibrated mode costs of the candidate prediction modes in the calibrated mode information set; and
performing prediction on the target prediction unit by using the target prediction mode, to obtain encoded data of the target image block;
wherein:
  the at least one candidate prediction mode comprises an inter mode, the inter mode comprising at least one of a first prediction mode, a second prediction mode, or a third prediction mode;
  the first prediction mode comprises a mode in which index information of a reference image block related to the target image block is to be transmitted;
  the second prediction mode comprises a mode in which residual information of the target image block and the index information of the reference image block related to the target image block are to be transmitted; and
  the third prediction mode comprises a mode in which the residual information of the target image block, motion vector data of the target image block, and the index information of the reference image block related to the target image block are to be transmitted;
  the target threshold is associated with the reference prediction mode;
  when the reference prediction mode is the first prediction mode of the inter mode, the target threshold is equal to a first threshold, the first threshold being greater than an invalid value and less than a maximum of a pixel value range; and
  when the reference prediction mode is the second prediction mode or the third prediction mode of the inter mode, the target threshold is equal to a second threshold, the second threshold being greater than or equal to the first threshold and less than the maximum of the pixel value range.

2. A video encoding method, comprising:
obtaining a target prediction unit in a target image block and a mode information set of the target prediction unit, the mode information set comprising a plurality of candidate prediction modes and mode costs of the candidate prediction modes for the target prediction unit;

performing abnormal distortion point detection on the target prediction unit in at least one candidate prediction mode in the mode information set, to obtain a detection result corresponding to the at least one candidate prediction mode by:
  performing pixel value prediction on pixels in the target prediction unit by using a reference prediction mode, to obtain predicted values of the pixels, the reference prediction mode being any one of the at least one candidate prediction mode;
  calculating absolute values of residuals between pixel values and the predicted values of the pixels in the target prediction unit;
  determining, when there is a pixel having an absolute value of residual greater than a target threshold in the target prediction unit, that the detection result corresponding to the reference prediction mode indicates that there is an abnormal distortion point in the target prediction unit in the reference prediction mode; and
  determining, when there is no pixel having an absolute value of residual greater than the target threshold in the target prediction unit, that the detection result corresponding to the reference prediction mode indicates that there is no abnormal distortion point in the target prediction unit in the reference prediction mode;
calibrating at least one of the mode costs corresponding to the at least one candidate prediction mode in the mode information set according to the detection result to obtain calibrated mode costs of the candidate prediction modes and a calibrated mode information set comprising the plurality of candidate prediction modes and calibrated mode costs of the candidate prediction modes by:
  setting the calibrated mode cost of the reference prediction mode in the calibrated mode information set equal the mode cost of the reference prediction mode in the mode information set when the detection result corresponding to the reference prediction mode indicates that there is no abnormal distortion point in the target prediction unit in the reference prediction mode, the reference prediction mode being any mode of the inter mode; and
  setting, when the detection result corresponding to the reference prediction mode indicates that there is an abnormal distortion point in the target prediction unit in the reference prediction mode, the calibrated mode cost of the reference prediction mode in the calibrated mode information set according to an adjustment of the mode cost of the reference prediction mode in the mode information set calculated by using a cost adjustment policy in the reference prediction mode;
selecting a target prediction mode from the plurality of candidate prediction modes according to the calibrated mode costs of the candidate prediction modes in the calibrated mode information set the plurality of candidates; and
performing prediction on the target prediction unit by using the target prediction mode, to obtain encoded data of the target image block;
wherein:
  the at least one candidate prediction mode comprises an inter mode, the inter mode comprising at least one of a first prediction mode, a second prediction mode, or a third prediction mode;
  the first prediction mode comprises a mode in which index information of a reference image block related to the target image block is to be transmitted;
  the second prediction mode comprises a mode in which residual information of the target image block and the index information of the reference image block related to the target image block are to be transmitted; and
  the third prediction mode comprises a mode in which the residual information of the target image block, motion vector data of the target image block, and the index information of the reference image block related to the target image block are to be transmitted.

3. The method according to claim 2, wherein setting the calibrated mode cost of the reference prediction mode in the calibrated mode information set according to an adjustment of the mode cost of the reference prediction mode in the mode information set calculated by using a cost adjustment policy in the reference prediction mode comprises:
  amplifying, when the reference prediction mode is the second prediction mode or the third prediction mode of the inter mode, the mode cost of the reference prediction mode using a penalty factor, to obtain a calibrated mode cost of the reference prediction mode.

4. The method according to claim 3, wherein setting the calibrated mode cost of the reference prediction mode in the calibrated mode information set according to an adjustment of the mode cost of the reference prediction mode in the mode information set calculated by using a cost adjustment policy in the reference prediction mode comprises:
  obtaining a preset cost when the reference prediction mode is the first prediction mode of the inter mode, the preset cost being greater than mode costs of candidate prediction modes in the calibrated mode information set other than the first prediction mode and being greater than a mode cost of the first prediction mode in the mode information set; and
  setting, in the calibrated mode information set, the calibrated mode cost of the reference prediction mode to the preset cost.

5. The method according to claim 4, wherein selecting the target prediction mode from the plurality of candidate prediction modes according to the calibrated mode costs of the candidate prediction modes in the calibrated mode information set comprises:
  selecting, from the plurality of candidate prediction modes, a candidate prediction mode having a minimum calibrated mode cost in the calibrated mode information set as the target prediction mode.

6. The method according to claim 3, wherein setting the calibrated mode cost of the reference prediction mode in the calibrated mode information set according to an adjustment of the mode cost of the reference prediction mode in the mode information set calculated by using the cost adjustment policy in the reference prediction mode further comprises:
  setting, when the reference prediction mode is the first prediction mode of the inter mode, the calibrated mode cost of the first prediction mode in the calibrated mode information set equal to the mode cost of the reference prediction mode in the mode information set; and
  adding a disable flag for the first prediction mode, the disable flag indicating a use of the first prediction mode to perform prediction on the target prediction unit is forbidden.

7. The method according to claim 6, wherein selecting the target prediction mode from the plurality of candidate prediction modes according to the calibrated mode costs of the candidate prediction modes in the calibrated mode information set comprises:
  using a candidate prediction mode having a minimum calibrated mode cost as the target prediction mode when the candidate prediction mode having the minimum calibrated mode cost in the calibrated mode information set is not the first prediction mode, or the candidate prediction mode having the minimum calibrated mode cost in the calibrated mode information set is the first prediction mode, and the first prediction mode does not have the disable flag; and
  selecting, when the candidate prediction mode having the minimum calibrated mode cost in the calibrated mode information set is the first prediction mode, and the first prediction mode has the disable flag, a candidate prediction mode having a second minimum calibrated mode cost in the calibrated mode information set as the target prediction mode.

8. A video encoding device, comprising a memory for storing computer instructions and a processor in communication with the memory, wherein the processor, when executing the computer instructions, is configured to cause the video encoding device to:
  obtain a target prediction unit in a target image block and a mode information set of the target prediction unit, the mode information set comprising a plurality of candidate prediction modes and mode costs of the candidate prediction modes for the target prediction unit;
  perform abnormal distortion point detection on the target prediction unit in at least one candidate prediction mode in the mode information set, to obtain a detection result corresponding to the at least one candidate prediction mode by:
    performing pixel value prediction on pixels in the target prediction unit by using a reference prediction mode, to obtain predicted values of the pixels, the reference prediction mode being any one of the at least one candidate prediction mode;
    calculating absolute values of residuals between pixel values and the predicted values of the pixels in the target prediction unit;
    determining, when there is a pixel having an absolute value of residual greater than a target threshold in the target prediction unit, that the detection result corresponding to the reference prediction mode indicates that there is an abnormal distortion point in the target prediction unit in the reference prediction mode; and
    determining, when there is no pixel having an absolute value of residual greater than the target threshold in the target prediction unit, that the detection result corresponding to the reference prediction mode indicates that there is no abnormal distortion point in the target prediction unit in the reference prediction mode;
  calibrate at least one of the mode costs corresponding to the at least one candidate prediction mode in the mode information set according to the detection result, to obtain calibrated mode costs of the candidate prediction modes and a calibrated mode information set comprising the plurality of candidate prediction modes and calibrated mode costs of the candidate prediction modes;
  select a target prediction mode from the plurality of candidate prediction modes according to the calibrated mode costs of the candidate prediction modes in the calibrated mode information set; and
  perform prediction on the target prediction unit by using the target prediction mode, to obtain encoded data of the target image block;
  wherein:
    the at least one candidate prediction mode comprises an inter mode, the inter mode comprising at least one of a first prediction mode, a second prediction mode, or a third prediction mode;
    the first prediction mode comprises a mode in which index information of a reference image block related to the target image block is to be transmitted;
    the second prediction mode comprises a mode in which residual information of the target image block and the index information of the reference image block related to the target image block are to be transmitted; and
    the third prediction mode comprises a mode in which the residual information of the target image block, motion vector data of the target image block, and the index information of the reference image block related to the target image block are to be transmitted;
    the target threshold is associated with the reference prediction mode;
    when the reference prediction mode is the first prediction mode of the inter mode, the target threshold is equal to a first threshold, the first threshold being greater than an invalid value and less than a maximum of a pixel value range; and
    when the reference prediction mode is the second prediction mode or the third prediction mode of the inter mode, the target threshold is equal to a second threshold, the second threshold being greater than or equal to the first threshold and less than the maximum of the pixel value range.

9. A video encoding device, comprising a memory for storing computer instructions and a processor in communication with the memory, wherein the processor, when executing the computer instructions, is configured to cause the video encoding device to:
  obtain a target prediction unit in a target image block and a mode information set of the target prediction unit, the mode information set comprising a plurality of candidate prediction modes and mode costs of the candidate prediction modes for the target prediction unit;
  perform abnormal distortion point detection on the target prediction unit in at least one candidate prediction mode in the mode information set, to obtain a detection result corresponding to the at least one candidate prediction model by:
    performing pixel value prediction on pixels in the target prediction unit by using a reference prediction mode, to obtain predicted values of the pixels, the reference prediction mode being any one of the at least one candidate prediction mode;
    calculating absolute values of residuals between pixel values and the predicted values of the pixels in the target prediction unit;
    determining, when there is a pixel having an absolute value of residual greater than a target threshold in the target prediction unit, that the detection result corresponding to the reference prediction mode indicates that there is an abnormal distortion point in the target prediction unit in the reference prediction mode; and determining, when there is no pixel having an absolute value of residual greater than the target threshold in the target prediction unit, that the detection result corresponding to the reference prediction mode indicates that there is no abnormal distortion point in the target prediction unit in the reference prediction mode;

calibrate at least one of the mode costs corresponding to the at least one candidate prediction mode in the mode information set according to the detection result to obtain calibrated mode costs of the candidate prediction modes and a calibrated mode information set comprising the plurality of candidate prediction modes and calibrated mode costs of the candidate prediction modes by:

setting the calibrated mode cost of the reference prediction mode in the calibrated mode information set equal to the mode cost of the reference prediction mode in the mode information set when the detection result corresponding to the reference prediction mode indicates that there is no abnormal distortion point in the target prediction unit in the reference prediction mode, the reference prediction mode being any mode of the inter mode; and setting, when the detection result corresponding to the reference prediction mode indicates that there is an abnormal distortion point in the target prediction unit in the reference prediction mode, the calibrated mode cost of the reference prediction mode in the calibrated mode information set according to an adjustment of the mode cost of the reference prediction mode in the mode information set calculated by using a cost adjustment policy in the reference prediction mode;

select a target prediction mode from the plurality of candidate prediction modes according to the calibrated mode costs of the candidate prediction modes in the calibrated mode information set the plurality of candidates; and perform prediction on the target prediction unit by using the target prediction mode, to obtain encoded data of the target image block;

wherein:

the at least one candidate prediction mode comprises an inter mode, the inter mode comprising at least one of a first prediction mode, a second prediction mode, or a third prediction mode;

the first prediction mode comprises a mode in which index information of a reference image block related to the target image block is to be transmitted;

the second prediction mode comprises a mode in which residual information of the target image block and the index information of the reference image block related to the target image block are to be transmitted; and the third prediction mode comprises a mode in which the residual information of the target image block, motion vector data of the target image block, and the index information of the reference image block related to the target image block are to be transmitted.

10. The video encoding device according to claim 9, wherein to set the calibrated mode cost of the reference prediction mode in the calibrated mode information set according to an adjustment of the mode cost of the reference prediction mode in the mode information set calculated by using a cost adjustment policy in the reference prediction mode comprises:

to amplify, when the reference prediction mode is the second prediction mode or the third prediction mode of the inter mode, the mode cost of the reference prediction mode using a penalty factor, to obtain a calibrated mode cost of the reference prediction mode.

11. The video encoding device according to claim 9, wherein to set the calibrated mode cost of the reference prediction mode in the calibrated mode information set according to an adjustment of the mode cost of the reference prediction mode in the mode information set calculated by using a cost adjustment policy in the reference prediction mode further comprises:

to obtain a preset cost when the reference prediction mode is the first prediction mode of the inter mode, the preset cost being greater than mode costs of candidate prediction modes in the calibrated mode information set other than the first prediction mode and being greater than a mode cost of the first prediction mode in the mode information set; and to set, in the calibrated mode information set, the calibrated mode cost of the reference prediction mode to the preset cost.

* * * * *